US011720740B2

(12) United States Patent
Fesbinder et al.

(10) Patent No.: US 11,720,740 B2
(45) Date of Patent: Aug. 8, 2023

(54) REDUCING INTERFERENCE BETWEEN TWO TEXTS

(71) Applicant: READ TWOGETHER LTD., Jerusalem (IL)

(72) Inventors: David Allen Fesbinder, Jerusalem (IL); Alexander Postnikov, South Boston, MA (US)

(73) Assignee: READ TWOGETHER LTD., Jerusalem (IL)

( * ) Notice: Subject to any disclaimer, the term of this patent is extended or adjusted under 35 U.S.C. 154(b) by 0 days.

(21) Appl. No.: 17/827,649

(22) Filed: May 27, 2022

(65) Prior Publication Data
US 2023/0177252 A1    Jun. 8, 2023

Related U.S. Application Data

(60) Provisional application No. 63/286,378, filed on Dec. 6, 2021.

(51) Int. Cl.
*G06F 40/00* (2020.01)
*G06F 40/109* (2020.01)
*G06F 40/106* (2020.01)

(52) U.S. Cl.
CPC .......... *G06F 40/109* (2020.01); *G06F 40/106* (2020.01)

(58) Field of Classification Search
CPC .................................................. G06F 40/106
See application file for complete search history.

(56) References Cited

U.S. PATENT DOCUMENTS

| 5,803,629 | A  | * | 9/1998  | Neville  | G06F 40/109 400/9 |
| 6,282,327 | B1 | * | 8/2001  | Betrisey | G06T 11/203 382/256 |
| 8,330,760 | B1 | * | 12/2012 | Arnold   | G06T 11/203 345/611 |
| 10,713,417 | B2 | * | 7/2020 | Dhanuka | G06F 40/109 |
| 10,997,757 | B1 | * | 5/2021 | Hunter  | G06F 40/109 |
| 11,016,651 | B1 | * | 5/2021 | Black   | G06F 16/34 |
| 11,080,464 | B2 | * | 8/2021 | Mangla  | G06F 40/109 |

(Continued)

OTHER PUBLICATIONS

Changyuan Hu and R. D. Hersch, "Parameterizable fonts based on shape components," in IEEE Computer Graphics and Applications, vol. 21, No. 3, pp. 70-85, May/Jun. 2001, doi: 10.1109/38.920629. (Year: 2001).*

*Primary Examiner* — Scott T Baderman
*Assistant Examiner* — Barbara M Level
(74) *Attorney, Agent, or Firm* — Alexander Postnikov

(57) ABSTRACT

Methods and systems of displaying a first string of characters and a second string of characters on an electronic display in a manner to reduce interference between the first and second strings, where a layout of displayed content is preserved, the method including steps of receiving a first string of characters, receiving a second string of characters, identifying a first character in the first string that interferes with a second character in the second string, receiving a modified character corresponding to the first character, rendering the first string and the second string for display, and displaying the first string and the second string on an electronic display. In some embodiments, airspace scaling or deemphasis is used to generate modified characters.

1 Claim, 22 Drawing Sheets

(56) References Cited

U.S. PATENT DOCUMENTS

| | | | |
|---|---|---|---|
| 2003/0231184 A1* | 12/2003 | Gurney | G06F 40/163 345/581 |
| 2007/0139412 A1* | 6/2007 | Stamm | G06T 11/203 345/467 |
| 2014/0297256 A1* | 10/2014 | Rogowski | G06K 9/00 704/2 |
| 2015/0347356 A1* | 12/2015 | Beaver | G09G 5/26 345/472 |
| 2021/0019365 A1* | 1/2021 | Mangla | G06V 30/414 |
| 2021/0118207 A1* | 4/2021 | Kumawat | G06F 40/166 |
| 2021/0350066 A1* | 11/2021 | Ren | G06F 40/106 |
| 2022/0301244 A1* | 9/2022 | Kumawat | G06T 11/203 |

* cited by examiner

Prior Art

Deemphasizing overhanging portions reduces distractive interference —530

Deemphasizing overhanging portions reduces distractive interference —532

REDUCING INTERFERENCE BETWEEN TWO TEXTS

CROSS-REFERENCE TO RELATED APPLICATIONS

This application claims the benefit of U.S. provisional patent application No. 63/286,378 filed on Dec. 6, 2021, the content of which is incorporated by reference in its entirety.

BACKGROUND

The present invention relates to the field of displaying texts, and, in particular, to the field of reducing interference between two texts without changing a layout of display screen content.

SCOPE OF PRIOR ART

The terms used to describe the prior art are listed at the start of the detailed description. FIG. 1a shows a typical webpage as viewed through an internet browser. The webpage contains non-text content such as background elements, pictures, and hyperlink buttons, as well as text content such as texts.

One of the best ways to learn a foreign language is by reading texts in that language. Many internet browsers and browser extensions include tools that can translate an entire webpage into a desired foreign language. While such tools provide a foreign text to study, the original text is completely replaced, which can lead to confusion. For example, FIG. 1a shows a typical webpage in English and FIG. 1b shows a translated Spanish version of the webpage. If a reader stumbles across an unfamiliar word in the Spanish version of the webpage, he or she would have no reference text to determine the word's meaning.

Thus, to aid readers with understanding a foreign text, the original text should be displayed simultaneously with the foreign text. Preferably, there should be a correspondence between the texts where a reader can tell which words or phrases in the foreign text correspond to which words or phrases in the original text. This can be achieved by displaying a translation of the original text immediately above the original text. For example, FIG. 1c shows a Spanish translation added to the webpage of FIG. 1a. The proximity of the Spanish and English texts improve a reader's learning experience as he or she may quickly reference the English text to improve his or her understanding of the Spanish text. Here, however, the overlapping arrangement of the English and Spanish texts causes distractive interference between the two texts.

FIG. 1d shows the webpage of FIG. 1c where the lines of English text have been spaced apart to create room for the lines of translated Spanish text. Compared to the webpage of FIG. 1c, the text of FIG. 1d is less crowded and more pleasant to look at. However, the webpage of FIG. 1d has reduced functionality as the "Next Page" button is no longer visible, decreased harmony as there is too much text relative to the non-text content, and lower information density as less text can be displayed at once.

What is needed is a method of displaying original and translated texts in a manner to reduce interference between the two texts, where a layout of the displayed content is preserved. Preferably, the size and position of characters in the original text should be modified in a manner that preserves the readability of the original text.

SUMMARY

The present disclosure satisfies the foregoing needs by providing, inter alia, methods and systems of displaying a first string of characters and a second string of characters on an electronic display in a manner to reduce interference between the first and second strings. Preferably, the legibility of characters in the first string is unharmed, and the layout of displayed content is preserved. These objectives are achieved when modified characters are received and used in place of interfering characters where a first footprint of the modified character is not greater than a second footprint of the interfering character. In some embodiments, modified characters are generated using one of airspace scaling and deemphasis. The scaling operations may include scaling down at least one of an upper and lower airspace of an interfering character. The deemphasis operations may include one of shading, gradual shading, and hollowing-out a portion of an interfering character.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where.

DETAILED DESCRIPTION

As described above, the solutions present in the prior art, in one form or another, harm the layout of displayed content. To overcome such deficiencies, embodiments of the approaches disclosed herein are used to display texts in a manner which preserves the layout of displayed content. The disclosed approaches may be provided in a variety of manners, for example, procedural, computer implement, integrated into a system or apparatus, provided as a computer programming product, and the like.

Figure 1A:
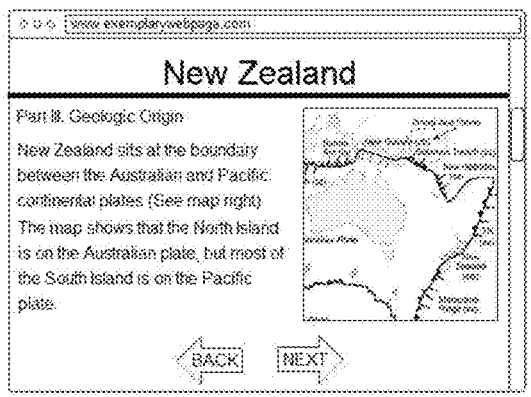
FIG. 1a shows a typical webpage in English, as seen in the prior art.
Figure 1B:
FIG. 1b shoes a translated Spanish version of the webpage of FIG. 1a, as seen in the prior art.
Figure 1C:
FIG. 1c shows a Spanish translation added to the webpage of FIG. 1a, as seen in the prior art.
Figure 1D:
FIG. 1d shows the webpage of FIG. 1c where the lines of English text have been spaced apart to create room for lines of Spanish text, as seen in the prior art.
Figure 2A:
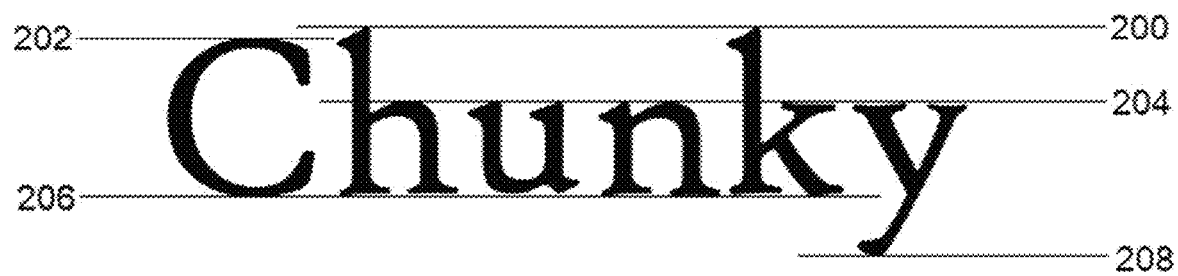
FIGS. 2a-2c show definitions used throughout the document.
Figure 2B:
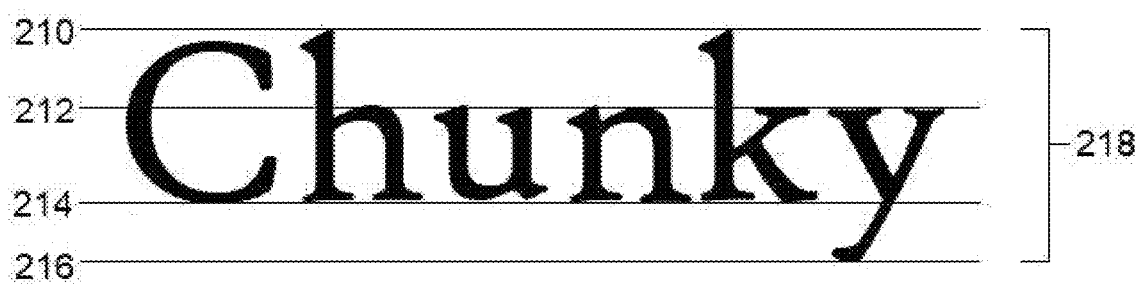
Figure 2C:
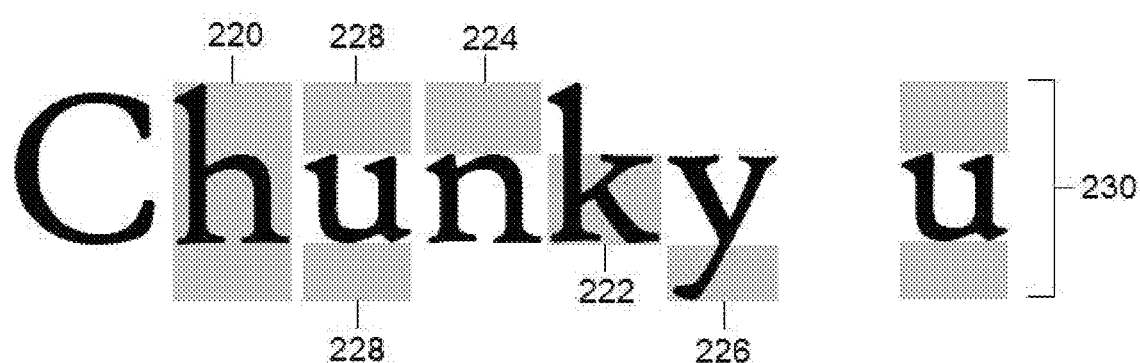

For the sake of convenience, the terms used to describe the prior art and various embodiments of the present invention are defined below. Some terms are illustrated in FIGS. 2a-2c for further clarification. It should be noted that these definitions are provided to merely aid in understanding the descriptions, and they do not, in any way, limit the scope of the present invention.

Display (verb): The verb "display," unless specified otherwise, refers to the act of presenting texts and/or content strings in any format that may be perceived by a reader of the texts and/or content strings, for example, but not limited to, presenting the texts and/or content strings on digital screens, printed medium, as holographs, and the like.

Display (noun): The noun "display," unless specified otherwise, refers to any sort of presentation of texts and/or content strings that may be perceived by a reader of the texts and/or content strings, for example, but not limited to, a presentation of the texts and/or content strings on digital screens, printed medium, as holographs, and the like.

Ascender height 200: The height of the ascenders, considered characteristic of a given typeface, font, or script. As illustrated in FIG. 2a, the ascender height of "Chunky" would be the height of the topmost points of the "h" and "k." The ascender height is sometimes referred to throughout the detailed description as the topmost point of a text in cases where the ascender height of a text is greater than or equal to the cap height of a text.

Ascender line: A horizontal line at the ascender height of a given typeface, font, or script.

Cap height 202: The height of capital letters, considered characteristic of a given typeface, font, or script. As illustrated in FIG. 2a, the cap height of "Chunky" would be the height of the topmost point of the "C." The cap height is sometimes referred to throughout the detailed description as the topmost point of a text in cases where the cap height of a text is greater than or equal to the ascender height of a text.

Cap line: A horizontal line at the cap height of a given typeface, font, or script.

X-height 204: The height of a lower-case x, considered characteristic of a given typeface, font, or script. As illustrated in FIG. 2a, the x-height of "Chunky" would be the height of the topmost points of the "u," "n," and "y." It shall be appreciated that for typefaces that do not employ Latin characters, such as Hebrew, an equivalent mean-height concept is applicable.

X-height line: A horizontal line at the x-height of a given typeface, font, or script. It shall be appreciated that for typefaces that do not employ Latin characters, such as Hebrew, an equivalent mean-line concept is applicable.

Base height 206: The height of the base of most letters of a given typeface, font, or script, typically set to 0. As illustrated in FIG. 2a, the base height of "Chunky" would be the height of the bottommost points of the "C," "h," "u," "n," and "k."

Base line: A horizontal line at the base height of a given typeface, font, or script.

Descender height 208: The height of the descenders, considered characteristic of a given typeface, font, or script. As illustrated in FIG. 2a, the descender height of "Chunky" would be the height of the bottommost point of the "y." The descender height is sometimes referred to throughout the description as the bottommost point of a text.

Descender line: A horizontal line at the descender height of a given typeface, font, or script.

Text ceiling 210: The typical position of the topmost points of a text, considered characteristic of a given typeface, font, or script. As illustrated in FIG. 2b, the text ceiling of the characters in "Chunky" is the position of topmost points of the "h," and "k."

Text x-height 212: The typical position of the x-height line of a text, considered characteristic of a given typeface, font, or script. As illustrated in FIG. 2b, the text x-height of the characters in "Chunky" is near the topmost points of the "u," "n," and "y." It shall be appreciated that for typefaces that do not employ Latin characters, such as Hebrew, an equivalent text mean-height concept is applicable.

Text base line 214: The typical position of the base line of a text, considered characteristic of a given typeface, font, or script. As illustrated in FIG. 2b, the text base line the characters in "Chunky" is near the bottommost points of the "C," "h," "u," "n," "k", and "y."

Text floor 216: The typical position of the bottommost points of a text, considered characteristic of a given typeface, font, or script. As illustrated in FIG. 2b, the text floor of the characters in "Chunky" is the position of the bottommost point of the "y."

Text height 218: The typical distance from the text floor to the text ceiling, considered characteristic of a given typeface, font, or script. As illustrated in FIG. 2b, the text height of the characters in "Chunky" is the distance from the bottommost point of "y" to the topmost points of "h" and "k."

Footprint 220: A rectangular area for each character, the bottom edge of the footprint bounded by a horizontal line at the text floor, the top edge of the footprint bounded by a horizontal line at the text ceiling, the left edge of the footprint bounded by a vertical line at the leftmost point of the character, and the right edge of the footprint bounded by a vertical line at the rightmost point of the character. As illustrated in FIG. 2c, the footprint of the "h" in "Chunky" is highlighted with a grey reference box behind the "h." The bottom edge of the footprint is bounded by a horizontal line at the text floor, the top edge of the footprint is bounded by a horizontal line at the text ceiling, the left edge of the footprint is bounded by a vertical line at the leftmost point of "k", and the right edge of the footprint is bounded by a vertical line at the rightmost point of "k".

Inner airspace 222: A rectangular area for each character, the bottom edge of the airspace bounded by the text base line, the top edge of the airspace bounded by the text x-height line, the left edge of the airspace bounded by a vertical line at the leftmost point of the character, and the right edge of the airspace bounded by a vertical line at the rightmost point of the character. As illustrated in FIG. 2c, the inner airspace of the "k" in "Chunky" is highlighted with a grey reference box behind the "k." The bottom edge of the airspace is bounded by the text base line of "k", the top edge of the airspace is bounded by the text x-height line of "k", the left edge of the airspace is bounded by a vertical line at the leftmost point of "k", and the right edge of the airspace is bounded by a vertical line at the rightmost point of "k".

Upper airspace 224: A rectangular area for each character, the bottom edge of the airspace bounded by the text x-height line, the top edge of the airspace bounded by a horizontal line at the text ceiling, the left edge of the airspace bounded by a vertical line at the leftmost point of the character, and the right edge of the airspace bounded by a vertical line at the rightmost point of the character. As illustrated in FIG. 2c, the upper airspace of the of the "n" in "Chunky" is highlighted with a grey reference box. The bottom edge of the airspace bounded by the text x-height line of "n", the top edge of the airspace is bounded by a horizontal line at the text ceiling, the left edge of the airspace is bounded by a vertical line at the leftmost point of "n", and the right edge of the airspace bounded by a vertical line at the rightmost point of "n".

Lower airspace 226: A rectangular area for each character, the bottom edge of the airspace bounded by a horizontal line at the text floor, the top edge of the airspace bounded by a horizontal line at the text base line, the left edge of the airspace bounded by a vertical line at the leftmost point of the character, and the right edge of the airspace bounded by a vertical line at the rightmost point of the character. As illustrated in FIG. 2c, the lower airspace of the of the "y" in "Chunky" is highlighted with a grey reference box. The bottom edge of the airspace is bounded by a horizontal line at the text floor, the top edge of the airspace is bounded by the text base line of "n", the left edge of the airspace is bounded by a vertical line at the leftmost point of "n", and the right edge of the airspace bounded by a vertical line at the rightmost point of "n".

Outer airspace 228: The combination of the upper airspace and the lower airspace of each character. As illustrated in FIG. 2c, the outer airspace of the "u" in "Chunky" is highlighted with grey reference boxes.

Character height 230: The distance from the bottommost point of the outer airspace to the topmost point of the outer airspace of a character. As illustrated in FIG. 2c, the character height of the "u" in "Chunky" would be the distance from the bottommost point of the outer airspace to the topmost point of the outer airspace of the "u."

Interference: Any visual interaction between a first text and a second text that harms the readability of at least one of the texts.

Overlap: When an area is occupied by two or more texts, airspaces, or other objects.

Superimpose: To place a first text over a second text in a manner that results in only the first text being visible in any overlapping portions.

Enter (verb): A first object entering a second object means that the first object is one of flush with and inside of the second object.

String of characters: A string of at least one character.

Figure 4A:
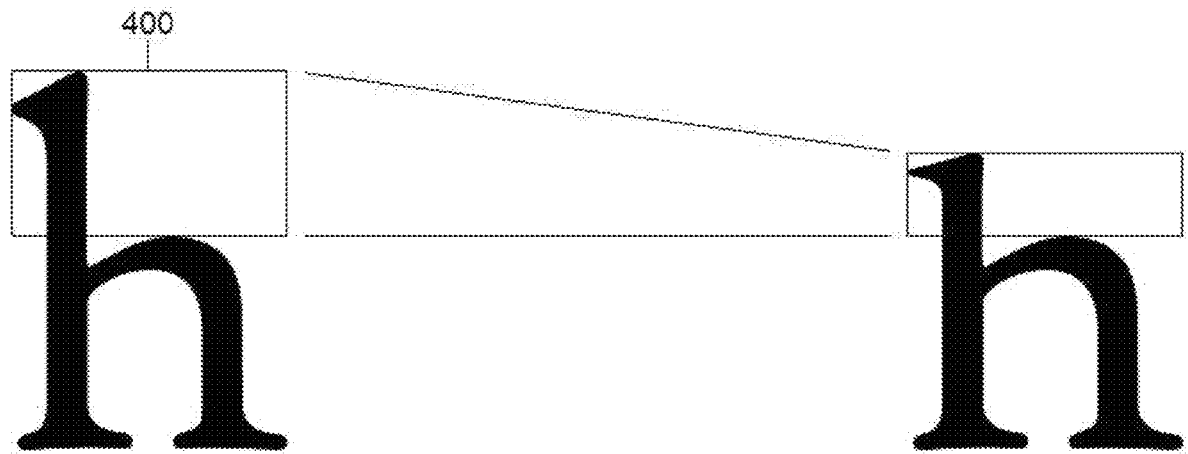
FIGS. 4a-4k show various modifications employed in the conversion of unmodified characters to modified characters.
Figure 4B:
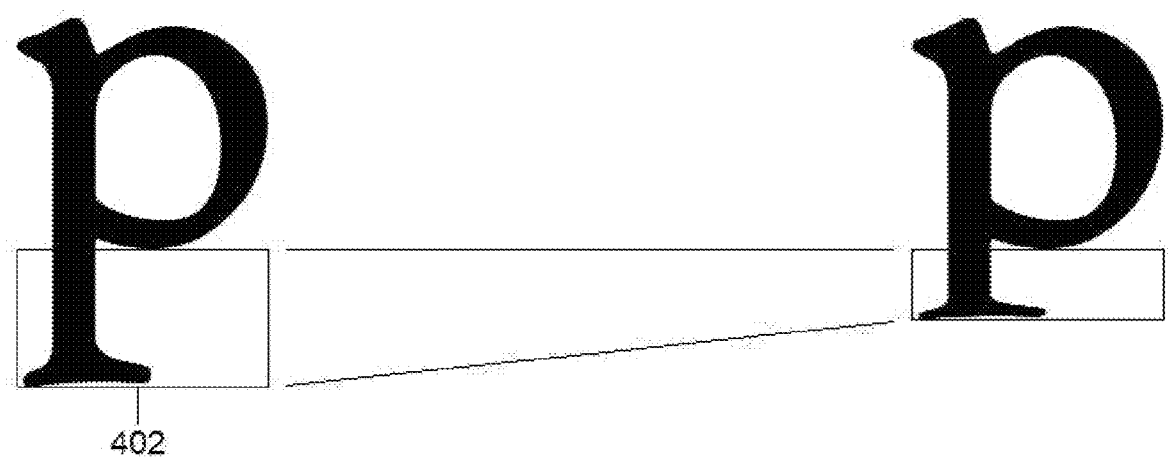
Figure 4C:
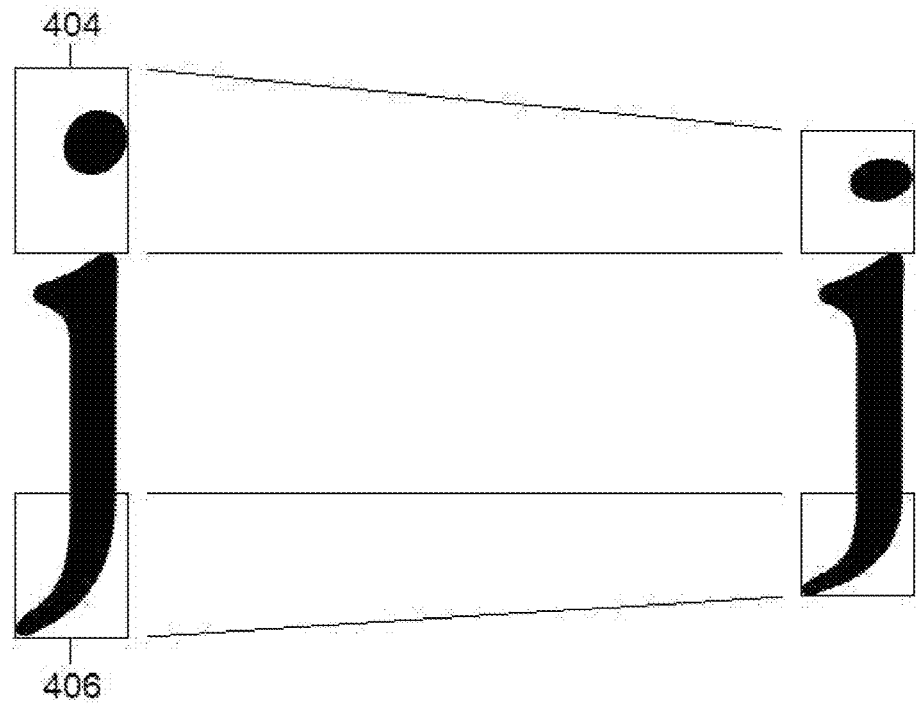
Figure 4D:
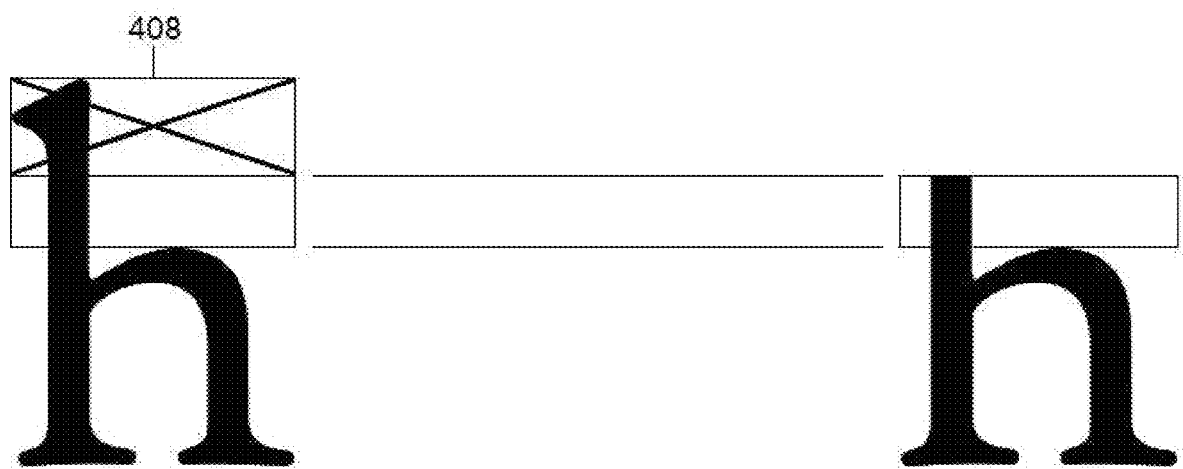
Figure 4E:
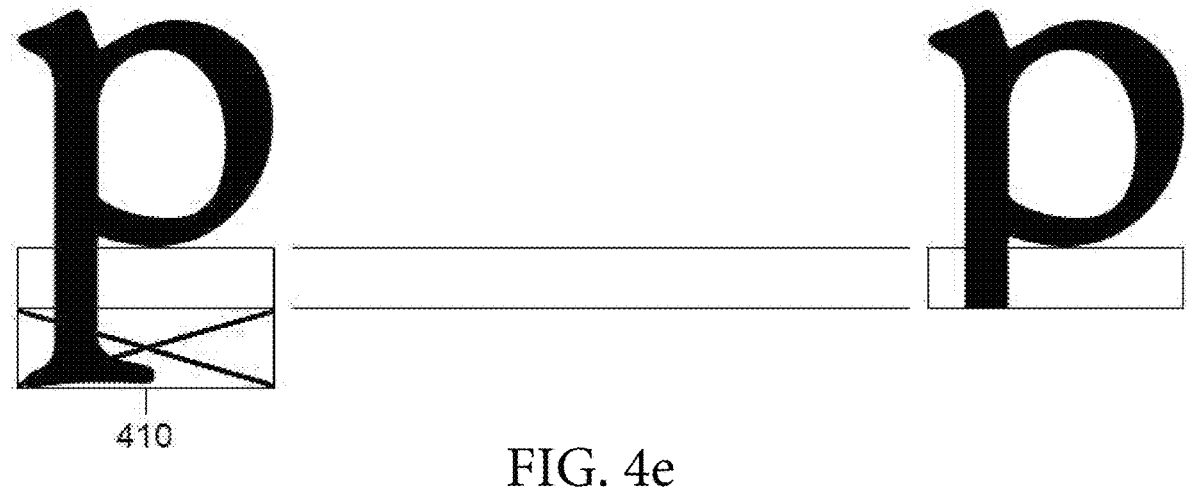
Figure 4F:
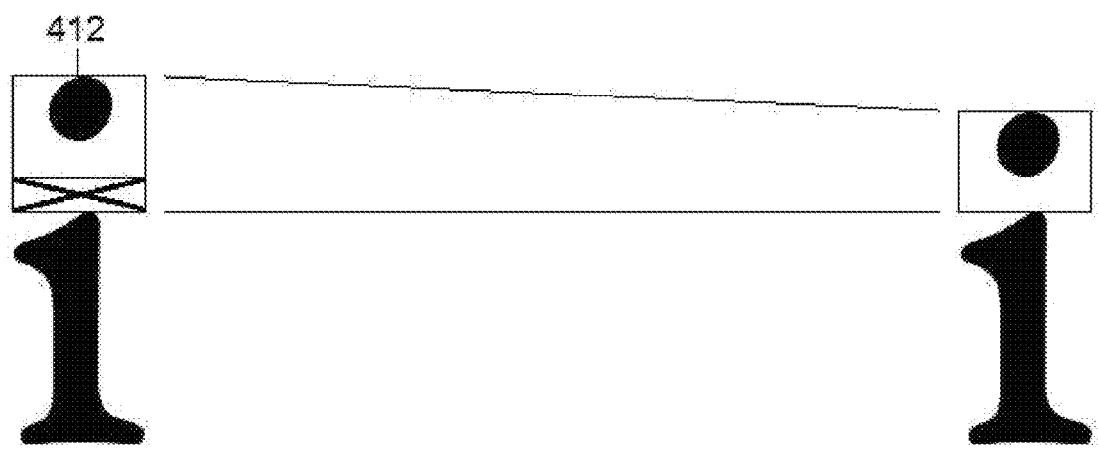
Figure 4G:
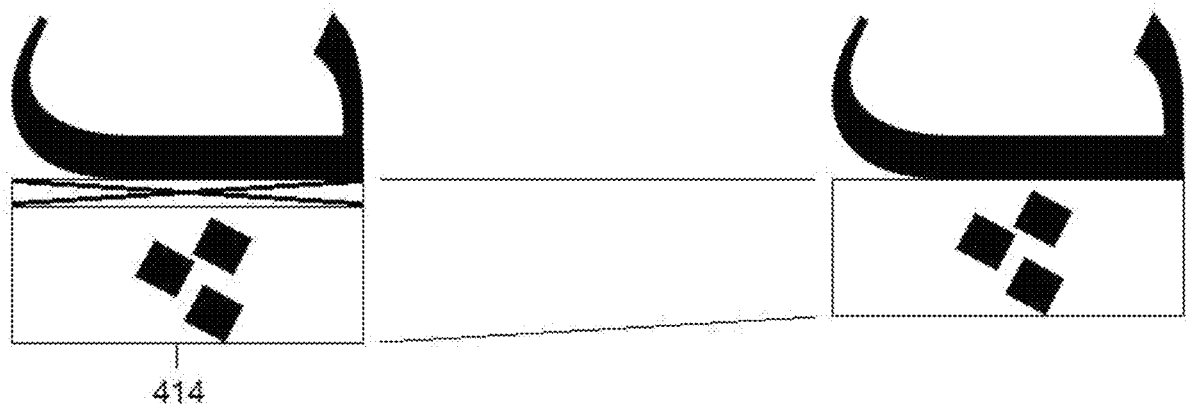
Figure 4H:
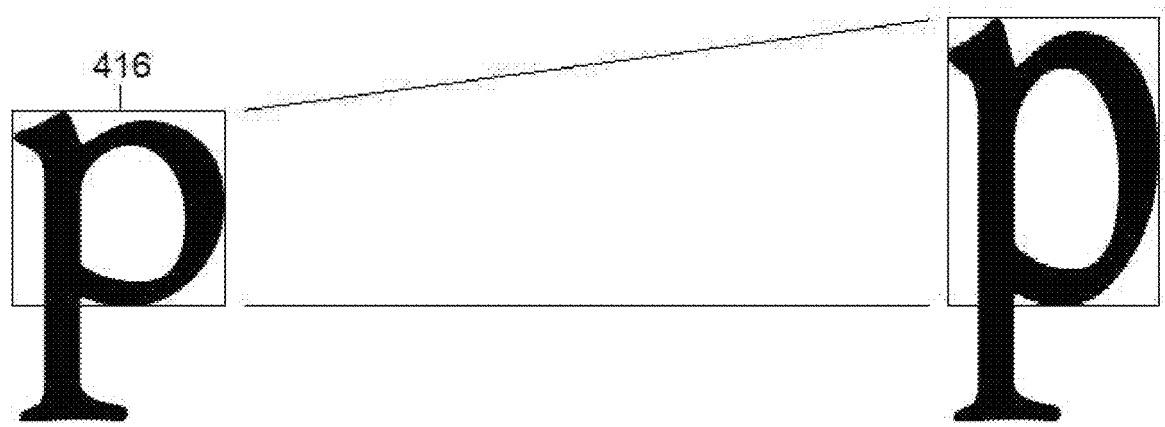

Scaling up: Any operation that increases the vertical height of an area without changing its width. FIG. 4h depicts the scaling up of the inner airspace of the letter "p" by expanding the inner airspace.

Scaling down: Any operation that decreases the vertical height of an area without changing its width. FIG. 4a depicts the scaling down of the upper airspace of the letter "h" by compressing the upper airspace.

Deemphasis: Any modification to a portion of a character that makes the portion less prominent than a remainder of the character.

It shall be noted that, unless specified otherwise, the following exemplary methods can be applied to characters and texts of any typeface, font, and size. For example, the methods can be applied to characters displayed in 12-point Times New Roman typeface as well as to characters displayed in 10-point Calibri typeface. These examples, as well as all other illustrated and described typefaces, font sizes, and fonts, are not inclusive and shall not be interpreted in any way to limit the scope of the present invention.

Figure 3:
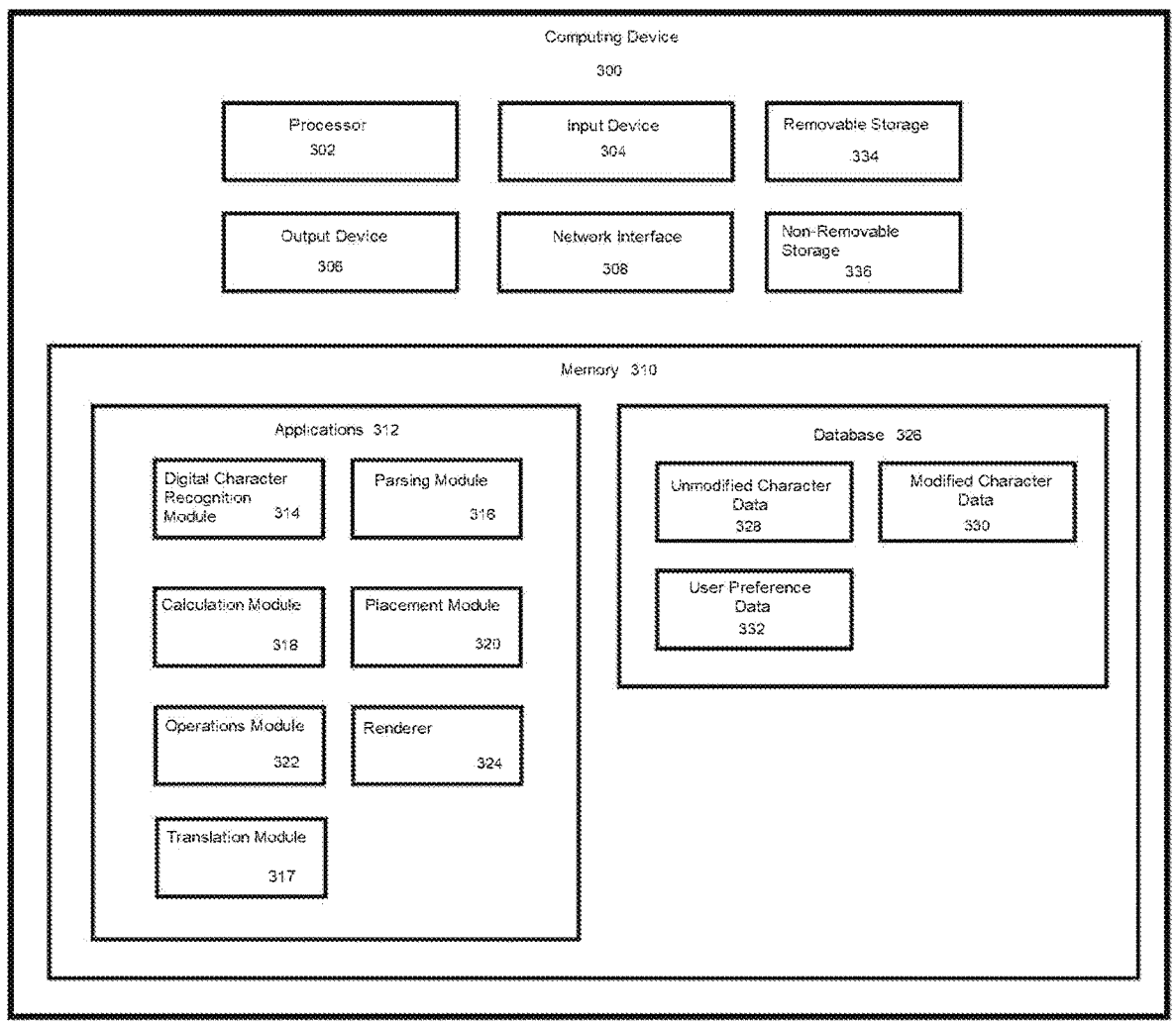
FIG. 3 shows a block diagram illustrating example physical components of a computing device with which aspects of the disclosure may be practiced.

Reference is now made to FIG. 3, which shows a block diagram illustrating example physical components of a computing device 300 with which aspects of the disclosure may be practiced. The computing device may be referred to as the system.

In a preferred embodiment, the computing device 300 includes at least one processor 302, an input device 304 such as a keyboard, mouse, and or touchscreen, and an output device 306 such as a printer or an electronic display in any of the various forms associated with computing devices. The computing device may also include a network interface 308 for network enablement. It should be appreciated that processing may be implemented either locally or remotely via various forms of wireless or wired networking technologies or a combination of both.

The memory 310 may include various types of short and long-term memory as is known in the art. Memory 310 may be loaded with various applications 312 including a digital character recognition module 314 for identifying characters on display screens as will be further discussed, a parsing module 316 for identifying characters and associated character metadata by parsing the tags of HTML content and associated Cascading Style Sheet (CSS) files as will be further discussed, a translation module 317 for translating various foreign languages into either English or other chosen languages, a calculation module 318 for defining the airspaces of characters as will be further discussed, a placement module 320 for placing and/or superimposing characters and/or strings of characters as will be further discussed, an operations module 322 for performing various modifications to unmodified characters as will be further discussed, and a renderer 324 for rendering the modified characters and/or strings of modified characters for display as will be further discussed. Accordingly, memory 310 includes all necessary modules per each embodiment.

Memory 310 may also include a database 326 loaded with unmodified character data 328 and modified character data 330. Unmodified character data may include all metadata associated with unmodified characters including, but not limited to, unmodified character typefaces, fonts, point sizes, dimensions, etc. Modified character data may include metadata of unmodified characters that have been previously modified, including unmodified character metadata, a list of modifications performed on the unmodified character, modified character appearance, etc. If the computing device has previously performed specific modifications on a specific unmodified character, it may recall the appropriate modified character to be rendered for display from modified character data rather than performing modifications on the unmodified character. In certain embodiments, the database 326 may be implemented locally, whereas in other embodiments, the database 326 may be implemented remotely.

Text specific values that depend on text properties including, but not limited to, text ceiling, text floor, text x-height, and text base line, may be stored as part of unmodified character data 328. Preferred user settings and character modifications may be saved as user preference data 332. Accordingly, the database 326 includes all necessary content per each embodiment.

The term computer readable media as used herein may include computer storage media. Computer storage media may include volatile and nonvolatile, removable and non-removable media implemented in any method or technology for storage of information, such as computer readable instructions, data structures, or program modules. The memory 310, the removable storage device 334, and the non-removable storage device 336 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 300. Any such computer storage media may be part of the computing device 300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The computing device 300 is operative to employ various font technologies like variable fonts, raster, vector, TrueType, and Microsoft OpenType and the database 326 also includes associated font-resource files.

The first, second, third, and fourth modifications described below are part of a first set of modification rules. The first set of modification rules include modifying a character using at least one of the first, second, third, and fourth modifications.

A first modification in the conversion of unmodified characters into modified characters is compressing a portion of an outer airspace of an unmodified character. FIG. 4*a* shows the upper airspace 400 of the character "h" compressed. FIG. 4*b* shows the lower airspace of the character "p" compressed. According to another embodiment, the entire outer airspace of a character is compressed. FIG. 4*c* shows the upper airspace 404 and lower airspace 406 of the character "j" compressed.

A second modification in the conversion of characters into modified characters is truncating a portion of the outer airspace of a character. FIG. 4*d* shows a portion of the upper airspace 408 of the character "h" truncated. FIG. 4*e* shows a portion of the lower airspace 410 of the character "p" truncated.

A third modification in the conversion of unmodified characters into modified characters is lowering a portion of an ascender of the character. FIG. 4*f* shows the detached ascender 412 of the character "i" lowered.

A fourth modification in the conversion of unmodified characters into modified characters is raising a portion of the descender of the character. FIG. 4*g* shows the detached descender 414 of the character "ϥ" raised.

A fifth modification involved in the conversion of unmodified characters into modified characters is expanding the inner airspace of the character. FIG. 4*h* shows the inner airspace 416 of the character "p" expanded.

The sixth, seventh, and eighth modifications below are part of a second set of modification rules. The second set of modification rules include modifying a character using at least one of the sixth, seventh, and eighth modifications.

Figure 4I:

A sixth modification in the conversion of unmodified characters into modified characters is shading a portion an unmodified character. FIG. 4*i* shows an upper airspace portion of the character "h" shaded. According to another embodiment, any portion of a character near an interference is shaded.

Figure 4J:

A seventh modification in the conversion of unmodified characters into modified characters is gradually shading a portion of an unmodified character. FIG. 4*j* shows an upper airspace portion of the character "h" gradually shaded.

According to another embodiment, any portion of a character near an interference is shaded.

Figure 4K:
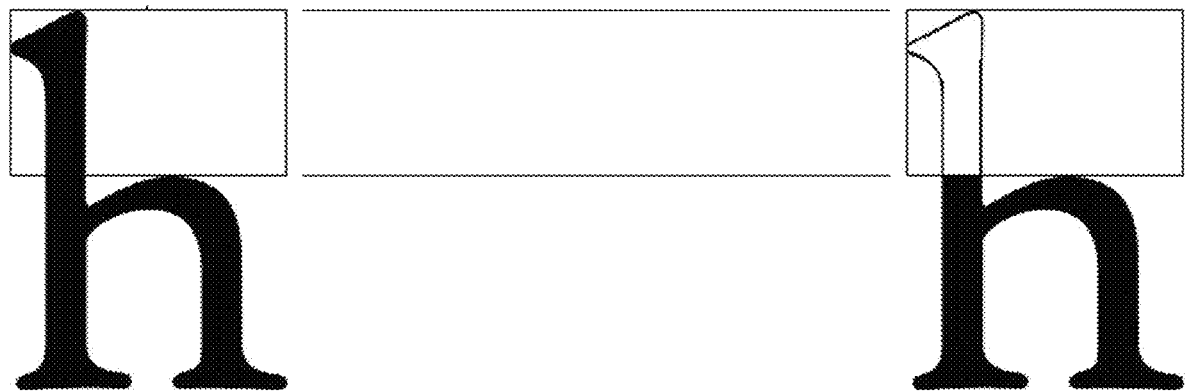

An eighth modification in the conversion of unmodified characters into modified characters is hollowing-out a portion of an unmodified character. FIG. 4k shows an upper airspace portion of the character "h" hollowed-out. According to another embodiment, any portion of a character near an interference is shaded.

Deemphasizing a portion of a character relative to a remainder of the character draws attention away from the deemphasized portion.

Figure 5A:
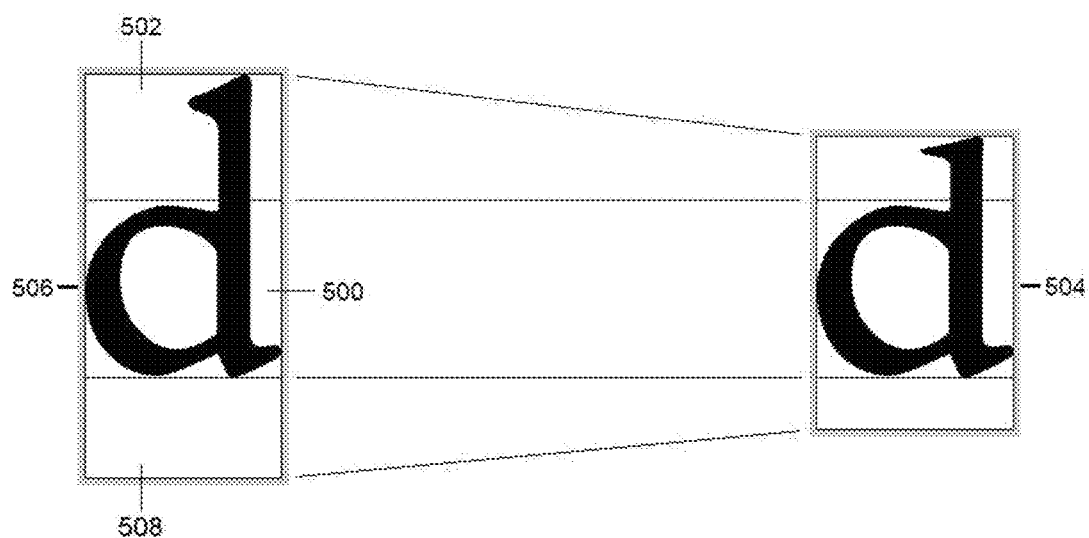
FIG. 5a shows a conversion of an unmodified character into a modified character, where the footprint of the modified character is smaller than the footprint of its corresponding unmodified character.

According to an embodiment, the footprint of a modified character is smaller than the footprint of its corresponding original character. FIG. 5a shows the upper airspace 502 and the lower airspace 508 of the character "d" compressed while the inner airspace 500 remains unchanged. Here, the footprint 504 of the modified "d" (right) is smaller than the footprint 506 of the original "d" (left).

Scaling down a character's outer airspace maintains the legibility of the character while decreasing the character's footprint. This scaling operation takes advantage of how the human mind identifies characters. A character's outer airspace contains a minority of the text body, and, consequently, a minority of the information as to the identity of the character. Text body portions in the outer airspace, such as an ascender or descender, are mainly used to distinguish the character from similar characters. Scaling down the outer airspace makes the character more compact while maintaining its legibility.

Figure 5B:
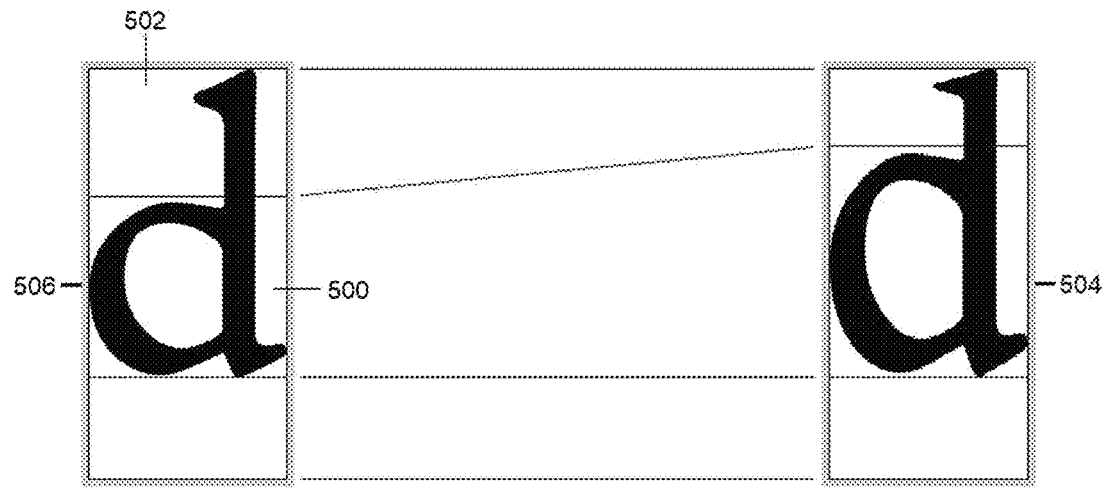
FIG. 5b shows a conversion of an unmodified character into a modified character, where the footprint of the modified character is equal to the footprint of its corresponding unmodified character.

According to another embodiment, the footprint of a modified character does not exceed the footprint of its corresponding original character. FIG. 5b shows the inner airspace 500 of the character "d" expanded and the upper airspace 502 of the character "d" compressed. Here, the footprint 504 of the modified "d" (right) is the equal to the footprint 506 of the original "d" (left).

Scaling up a character's inner airspace while scaling down its outer airspace improves the legibility of the character while maintaining the character's footprint. These scaling operations take advantage of how the human mind identifies characters. A character's inner airspace contains most of the text body, and, consequently, most of the information as to the identity of the character. Scaling up the inner airspace increases the area of the text body and makes the character easier to recognize.

Preferably, a character's inner airspace should be scaled up to cover the character's entire footprint. However, complete coverage of a character's footprint is not possible in every case. Many characters have ascenders or descenders that are necessary to distinguish those characters from other characters. For example, the character "h," without its ascender, would too closely resemble the character "n." In such cases, as seen in FIG. 5b, the ascender is scaled down to maintain the modified character's footprint. The modified "d" (right) has the same footprint as the original "d" (left). However, the modified "d" is easier to read, especially at increased distances.

Figure 5C:
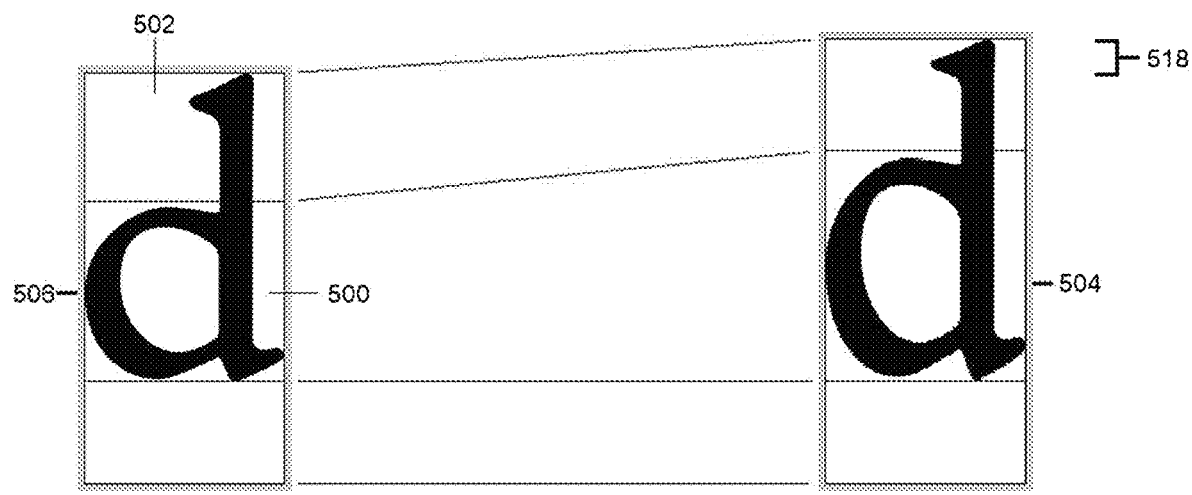
FIG. 5c shows a conversion of an unmodified character into a modified character, where the footprint of the modified character is larger than the footprint of its corresponding unmodified character.

According to another embodiment, the footprint of the modified character exceeds the footprint of its corresponding original character. FIG. 5c shows the inner airspace 500 of the character "d" expanded and the upper airspace 502 of the character "d" compressed. Here, the footprint 504 of the modified "d" exceeds the footprint 506 of its corresponding character. Portions of the modified character above the text ceiling or below the text floor of the original character are referred to herein as overhanging portions 518. Here, the top of the modified "d" is overhanging.

Figure 5D:
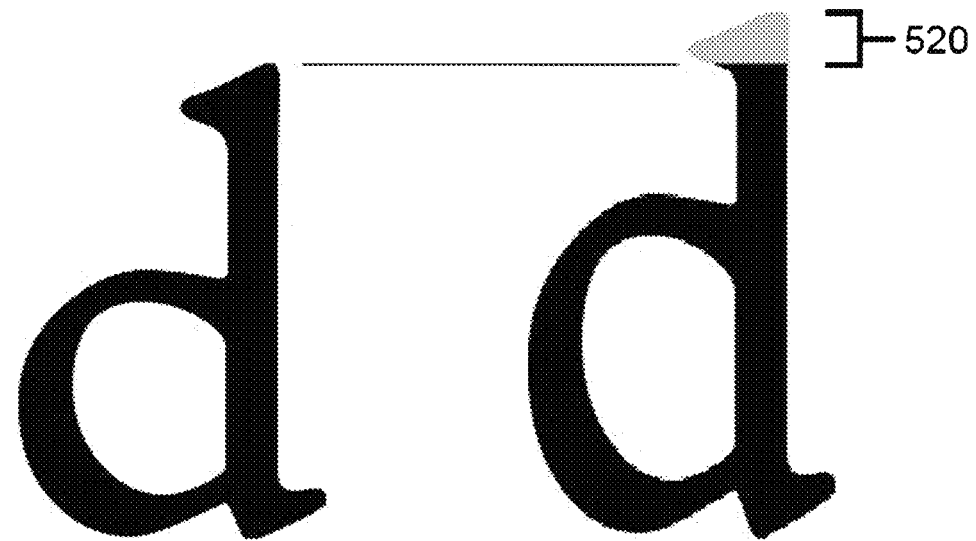
FIG. 5d shows a modified character where the overhanging portion is shaded.
Figure 5E:
FIG. 5e shows a modified character where the overhanging portion is gradually shaded.
Figure 5F:
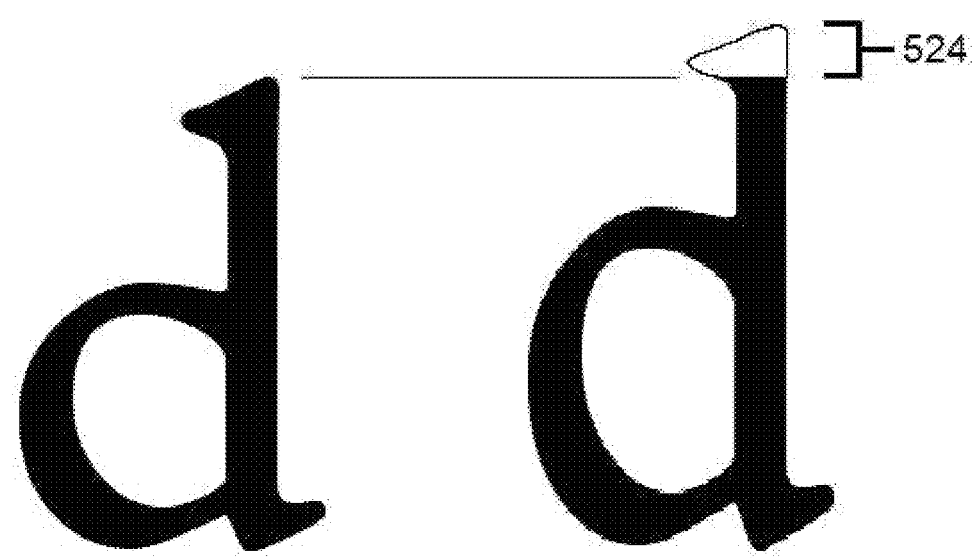
FIG. 5f shows a modified character where the overhanding portion is hollowed-out.

The overhanging portion 518 may be deemphasized relative to a remainder of the modified character. FIG. 5d shows the overhanging portion 520 of the modified "d" shaded. FIG. 5e shows the overhanging portion 522 of the modified "d" gradually shaded. FIG. 5f shows the overhanging portion 524 of the modified "d" hollowed-out. The system may be configured to perform such deemphasizing operations on overhanging portions 518.

Figures 5G, 5H:
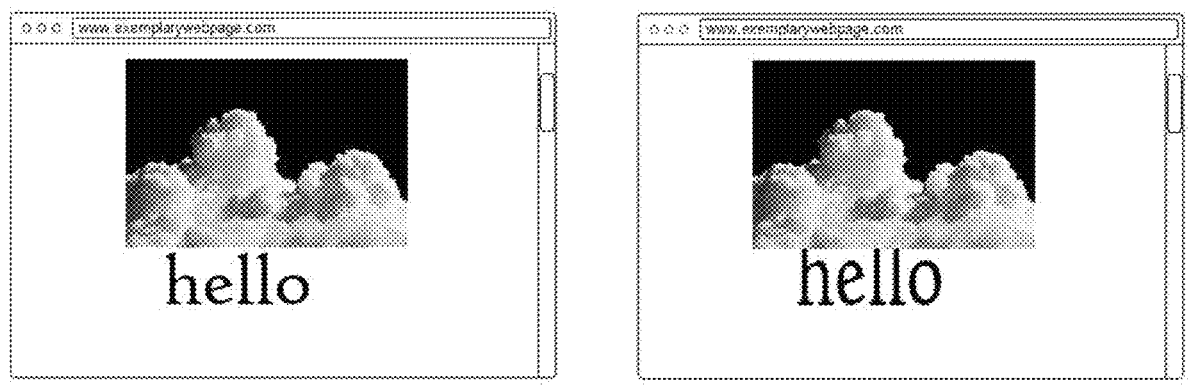
FIG. 5g shows how scaling up a character's inner airspace and deemphasizing overhanging portions improves the legibility of the character while minimizing any distractive interference caused by the character.
FIG. 5h shows how scaling up a character's inner airspace and deemphasizing interfering portions improves the legibility of the character while minimizing any distractive interference caused by the interfering portions entering non-text content.

Scaling up a character's inner airspace and deemphasizing overhanging portions improves the legibility of the character while minimizing any distractive interference caused by the character's increased footprint. FIG. 5g shows the text "Deemphasizing overhanging portions reduces distractive interference" in its unmodified (top) and modified (bottom) forms. The footprint 530 of the original text is equal to the footprint 532 of the modified text. The second line in the modified text has been modified by scaling up an inner airspace of each character and deemphasizing overhanging portions of each character.

The second line in the modified text is easier to read than the second line in the original text. While the footprint of each character in the second line has increased, there is still a clear gap in between the first and second lines because of the deemphasis of overhanging portions for each character in the second line.

Scaling up a character's inner airspace and deemphasizing interfering portions improves the legibility of the character while minimizing any distractive interference caused by the interfering portions entering non-text content. FIG. 5h shows the text "Hello" in its unmodified (left) and modified (right) forms. The modified characters have been modified by scaling up an inner airspace of each character and deemphasizing interfering portions of each character. Here, the interfering portions that enter non-text content have been hollowed-out.

Figure 6:
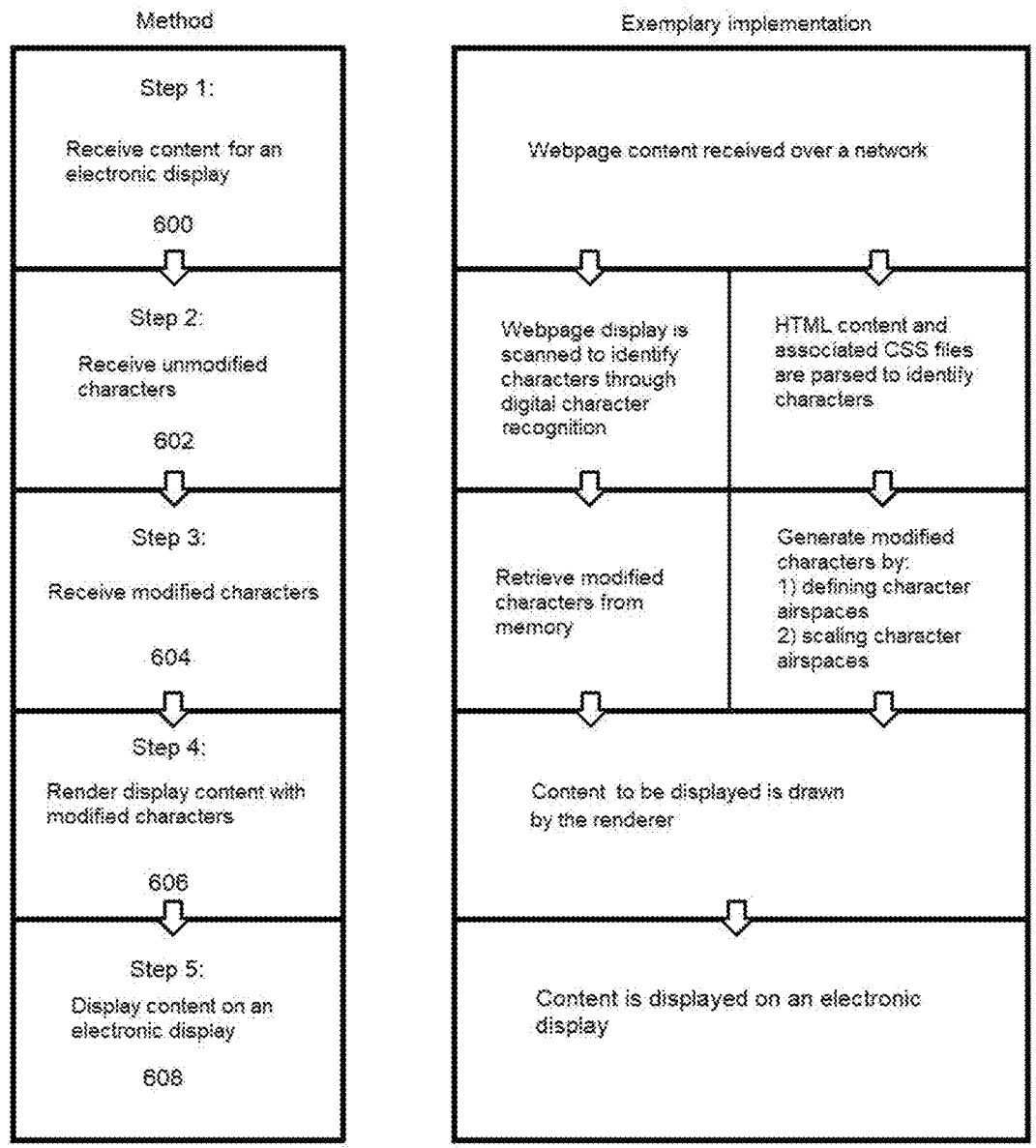
FIG. 6 shows a method for displaying text on an electronic display to improve the legibility of the text without changing the layout of displayed content. Exemplary ways to implement a step in the method are included to the right of the corresponding step.

FIG. 6 illustrates an exemplary method for rendering text content on an electronic display to improve the legibility of the text content without changing the layout of displayed content. This method uses characters that have been modified by scaling up an inner airspace and scaling down an outer airspace.

In step 1 600, the content for an electronic display is received.

According to an embodiment, the computing device receives content over a network.

In step 2 602, the unmodified characters are received.

According to an embodiment, unmodified characters are received when the digital character recognition module scans the content to identify characters. The entirety of the content may be scanned. Alternatively, a user may select a portion of the content to be scanned. Metadata (identity, position, typeface, font, etc.) of each unmodified character may be saved to unmodified character data.

According to another embodiment, unmodified characters are received when the parsing module parses HTML content and associated CSS files. The entirety of the HTML content and associated CSS files may be parsed. Alternatively, a user may select a portion of the HTML content and associated CSS files to be parsed. The parsing module parses the tags of the HTML content to identify characters as well as associated Cascading Style Sheet (CSS) files to identify associated character metadata. Metadata (identity, position, typeface, font, size, etc.) of each unmodified character may be saved to unmodified character data.

In step 3 604, modified characters are received.

According to an embodiment, the modified characters are received when the calculation module retrieves, from modified character data, a modified character corresponding to each of the unmodified characters. Preferably, the attributes of the modified characters match the attributes of the unmodified characters, the only difference being that the modified characters have a greater airspace ratio. For example, in FIG. 5b, the unmodified character (left) is a 150-point High Tower Text "d" while its corresponding modified character (right) is a 150-point High Tower Text "d" with a greater airspace ratio.

According to another embodiment, the modified characters are received when the modified characters are generated. New modified characters may be generated when there are no modified characters with the desired attributes in the memory. Generating modified characters includes the steps of 1) defining character airspaces for the unmodified characters and 2) scaling the character airspaces. Specific scaling modifications may be chosen based on user preference.

Preferably, the calculation module retrieves, from unmodified character data, the positions of the text ceiling, the text floor, the text base line, and the text x-height line. The calculation module defines the upper airspace of the unmodified character as the area bounded by the text x-height line, the text ceiling, the leftmost point of the unmodified character, and the rightmost point of the unmodified character. The calculation module defines the inner airspace of the unmodified character as the area bounded by the text base line, the text x-height line, the leftmost point of the unmodified character, and the rightmost point of the unmodified character. The calculation module defines the lower airspace of the unmodified character as the area bounded by the text floor, the text base line, the leftmost point of the unmodified character, and the rightmost point of the unmodified character.

Alternatively, based on an unmodified character's metadata, the calculation module generates, with the same attributes as the unmodified character, an "x" as well as an exemplary string of characters with ascenders and descenders such as "pd." The text ceiling is set to the position of the topmost point of the exemplary string, the text floor is set to the position of the bottommost point of the exemplary string, the text base-line is set to the position of the bottommost point of the "x," and the text x-height line is set to the position of the topmost point of the "x." The calculation module defines the upper airspace of the unmodified character as the area bounded by the text x-height line, the text ceiling, the leftmost point of the unmodified character, and the rightmost point of the unmodified character. The calculation module defines the inner airspace of the unmodified character as the area bounded by the text base line, the text x-height line, the leftmost point of the unmodified character, and the rightmost point of the unmodified character. The calculation module defines the lower airspace of the unmodified character as the area bounded by the text floor, the text base line, the leftmost point of the unmodified character, and the rightmost point of the unmodified character.

Preferably, the operations module scales up an inner airspace of each unmodified character and scales down the outer airspace of each unmodified character. The modified characters may be saved to the modified character data.

Alternatively, the operations module scales up an inner airspace of each unmodified character and scales down the outer airspace of each unmodified character, where the outer airspace is scaled down according to the first set of modification rules, the first set of modification rules including at least one of the first, second, third, and fourth modifications. The modified characters may be saved to the modified character data.

In step 4 606, the content is rendered for display.

According to one embodiment, the renderer, in conjunction with the placement module, draws the content to be displayed on the display screen. The modified characters are used in place of their corresponding unmodified characters based on positional metadata of the unmodified characters. Modified characters may be superimposed over their corresponding unmodified characters.

In step 5 608, the content is displayed on an electronic display.

Figure 7:
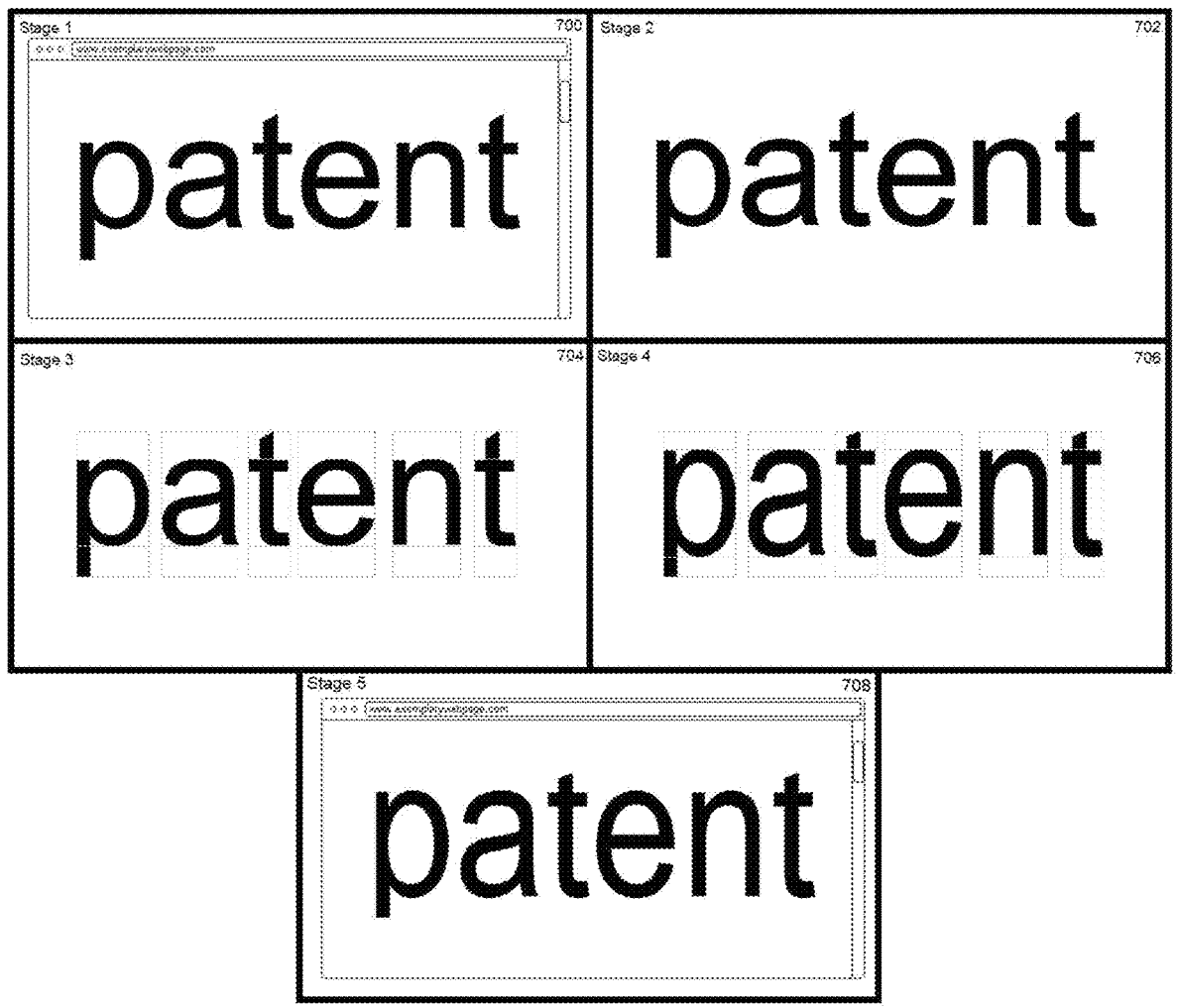
FIG. 7 shows the method of FIG. 6 as applied to a webpage, according to an embodiment.

FIG. 7 shows steps 1-5 of the method of FIG. 6 as applied to a webpage by the system of FIG. 3, in accordance with one embodiment of the present invention.

Stage 1 700 shows step 1, in which webpage content is received. Here, webpage content of "patent," in 150-point Arial, is received.

Stage 2 702 shows step 2, in which the unmodified characters are received. Here, the unmodified characters are identified as "p," "a," "t," "e," "n," and "t," all in 150-point Arial.

Stage 3 704 shows part of step 3, in which the modified characters are received when they are generated. The first step of generating modified characters is defining airspaces for each unmodified character. Here, the upper, inner, and lower airspaces of "p," "a," "t," "e," "n," and "t," are defined, highlighted with grey a reference box for each airspace.

Stage 4 706 shows part of step 3, in which the modified characters are received when they are generated. The second step of generating modified characters is scaling up an inside airspace of each of the unmodified characters and scaling down an outside airspace of each of the unmodified characters. Here, the upper and lower airspaces of "p," "a," "t," "e," "n," and "t," are compressed according to the first modification in the first set of modification rules, and the inner airspaces of "p," "a," "t," "e," "n," and "t," are expanded according to the fifth modification. The upper, inner, and lower airspaces of each modified character are highlighted with a grey reference box to better show the modifications.

Stage 5 708 shows steps 4 and 5, in which the webpage is rendered for display and displayed on an electronic screen. Here, the webpage content to be displayed is drawn, where modified characters are used in place of their corresponding unmodified characters.

The system embodies a significant advance over existing systems that cannot display characters in a manner that improves text legibility without disturbing the layout of displayed content.

Figure 8:
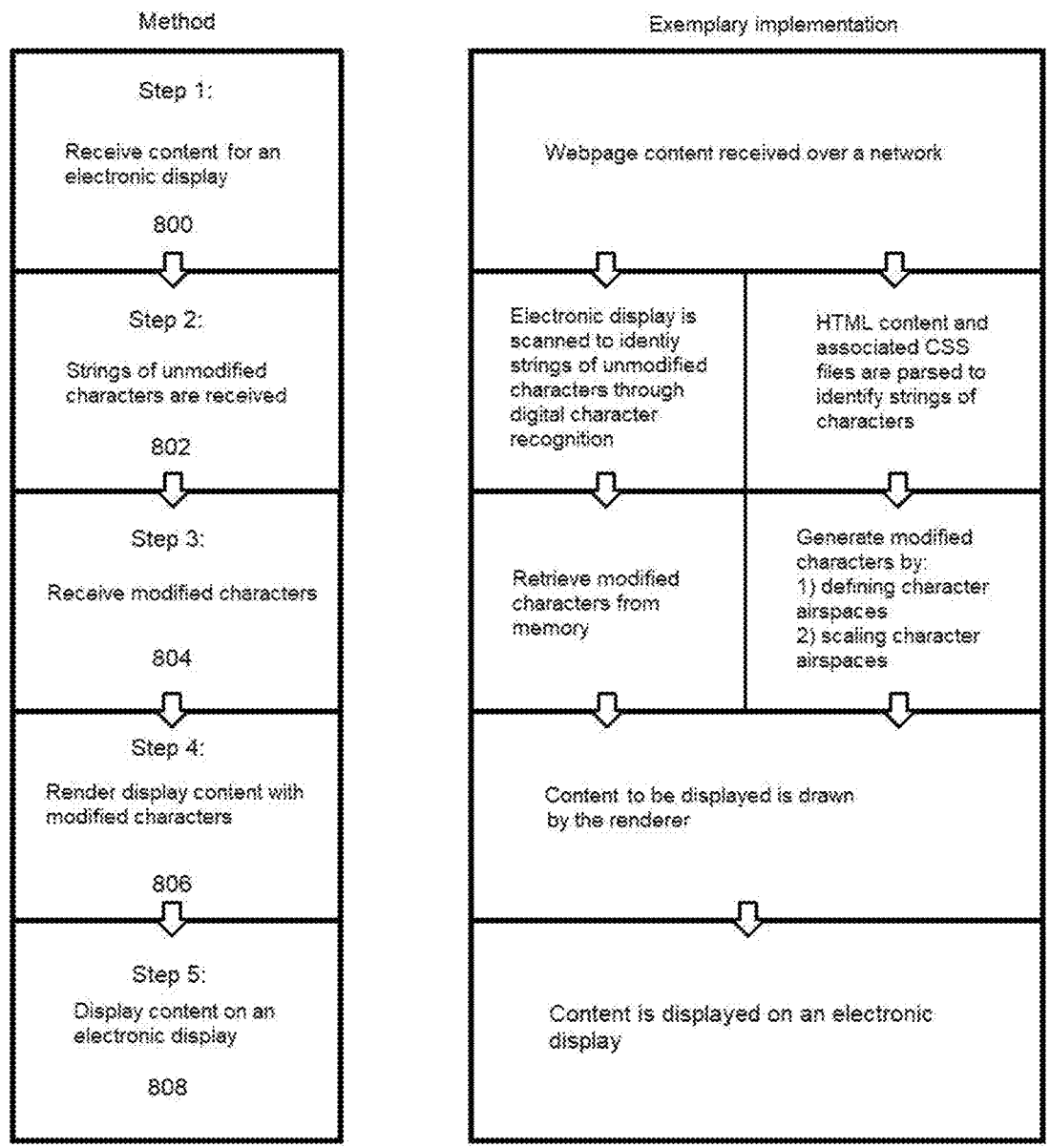
FIG. 8 shows a method for displaying text on an electronic display to increase information density of the text while maintaining legibility of the text. Exemplary ways to implement a step in the method are included to the right of the corresponding step.

FIG. 8 illustrates an exemplary method for displaying text on an electronic display in a manner to increase information density of the text while maintaining legibility of the text. This method uses characters that have been modified by scaling down an outer airspace.

In step 1 800, the content for an electronic display is received.

According to an embodiment, the computing device receives displayed content over a network.

In step 2 802, strings of unmodified characters (herein unmodified strings) are received.

According to an embodiment, unmodified strings are received when the digital character recognition module scans the content to identify unmodified strings. The entirety of the content may be scanned. Alternatively, a user may select a portion of the content to be scanned. Metadata (identity, position, typeface, font, etc.) of each unmodified character in the unmodified strings may be saved to unmodified character data.

According to another embodiment, unmodified strings are received when the entirety of the HTML content and associated CSS files are parsed to identify unmodified strings and associated metadata. Alternatively, a user may select a portion of the HTML content and associated CSS files to be parsed. The parsing module parses the tags of the HTML content to identify unmodified strings as well as associated Cascading Style Sheet (CSS) files to identify associated character metadata. Metadata (identity, position, typeface, font, size, etc) of each unmodified character in the unmodified strings may be saved to unmodified character data.

In step 3 804, modified characters are received.

According to an embodiment, the modified characters are received when the calculation module retrieves, from modified character data, a modified character corresponding to each of the unmodified characters. Preferably, the attributes of the modified characters match the attributes of the unmodified characters, the only difference being that the modified characters have scaled down outer airspaces. For example, in FIG. 5a, the unmodified character (left) is a 150-point High Tower Text "d" while its corresponding modified character (right) is a 150-point High Tower Text "d" with a scaled down outer airspace.

According to another embodiment, the modified characters are received when the modified characters are generated. New modified characters may be generated when there are no modified characters with the desired attributes in the memory. Generating the modified characters includes the steps of 1) defining character airspaces for the unmodified characters and 2) scaling the character airspaces. Specific scaling modifications may be chosen based on user preference.

Preferably, the calculation module retrieves, from unmodified character data, the positions of the text ceiling, the text floor, the text base line, and the text x-height line. The calculation module defines the upper airspace of the unmodified character as the area bounded by the text x-height line, the text ceiling, the leftmost point of the unmodified character, and the rightmost point of the unmodified character. The calculation module defines the inner airspace of the unmodified character as the area bounded by the text base line, the text x-height line, the leftmost point of the unmodified character, and the rightmost point of the unmodified character. The calculation module defines the lower airspace of the unmodified character as the area bounded by the text floor, the text base line, the leftmost point of the unmodified character, and the rightmost point of the unmodified character.

Alternatively, based on an unmodified character's metadata, the calculation module generates, with the same attributes as the unmodified character, an "x" as well as an exemplary string of characters with ascenders and descenders such as "pd." The text ceiling is set to the position of the topmost point of the exemplary string, the text floor is set to the position of the bottommost point of the exemplary string, the text base-line is set to the position of the bottommost point of the "x," and the text x-height line is set to the position of the topmost point of the "x." The calculation module defines the upper airspace of the unmodified character as the area bounded by the text x-height line, the text ceiling, the leftmost point of the unmodified character, and the rightmost point of the unmodified character. The calculation module defines the inner airspace of the unmodified character as the area bounded by the text base line, the text x-height line, the leftmost point of the unmodified character, and the rightmost point of the unmodified character. The calculation module defines the lower airspace of the unmodified character as the area bounded by the text floor, the text base line, the leftmost point of the unmodified character, and the rightmost point of the unmodified character.

Preferably, the operations module scales down the outer airspace of each unmodified character. The modified characters may be saved to the modified character data.

Alternatively, the operations module scales down the outer airspace of each unmodified character, where the outer airspace is scaled down according to the first set of modification rules, the first set of modification rules including at least one of the first, second, third, and fourth modifications. The modified characters may be saved to the modified character data.

In step 4 806, the content is rendered for display.

According to an embodiment, the renderer, in conjunction with the placement module, draws the content to be displayed on the display screen. The modified characters are used in place of their corresponding unmodified characters based on positional metadata of the unmodified characters. Modified characters may be superimposed over their corresponding unmodified characters. The modified strings may be placed closer together than corresponding unmodified strings.

According to another embodiment, the render, in conjunction with the placement module, draws the webpage content to be displayed on the display screen. The placement module vertically aligns unpaired pairs of modified strings such that, for each pair of modified strings, one modified string enters an airspace of the other modified string. If there is an odd number of modified strings, the last modified string is unpaired. Each pair of modified strings may be placed, in order, in the positions of the unmodified strings.

In step 5 808, the content is displayed on an electronic display.

Figure 9:
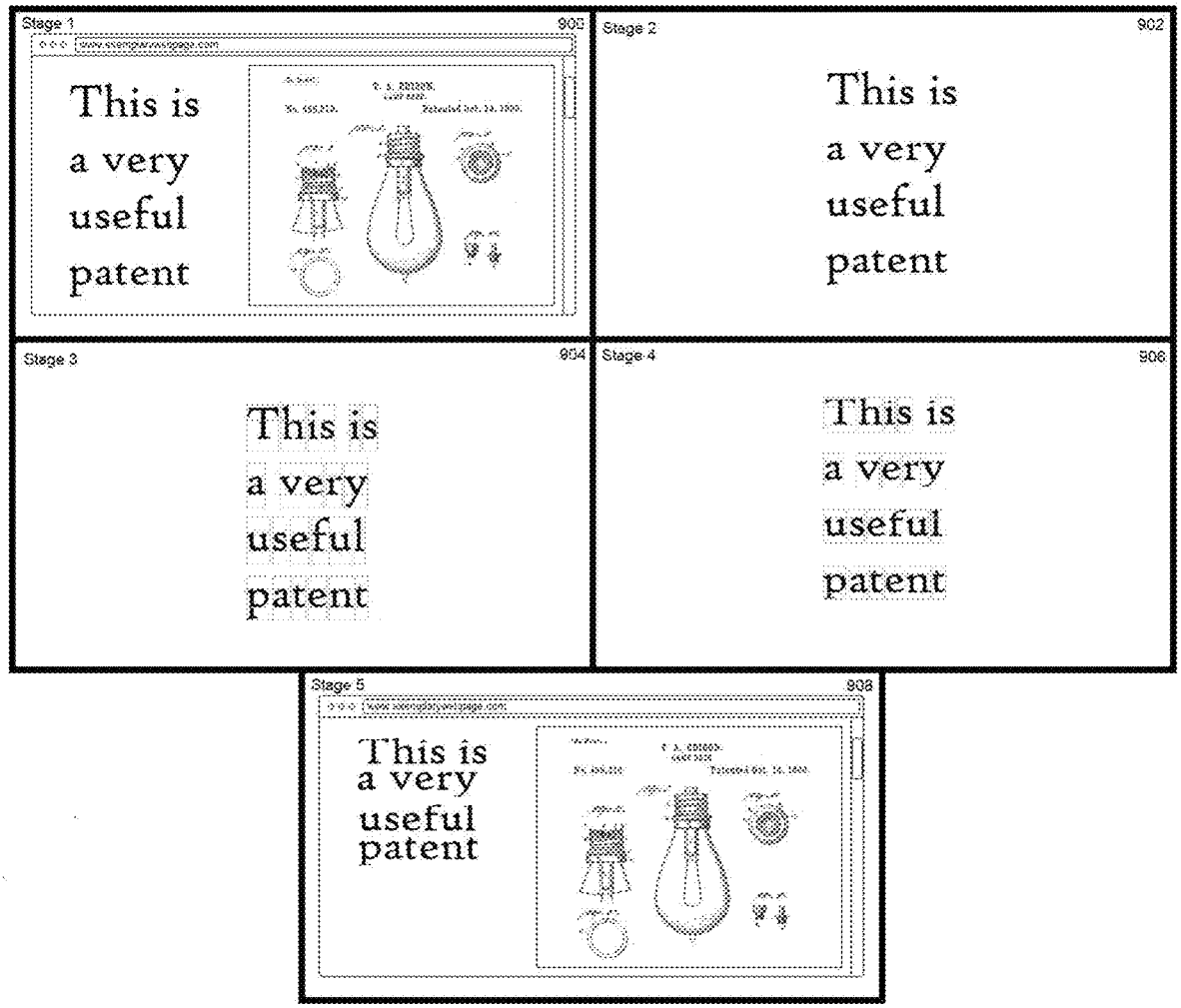
FIG. 9 shows the method of FIG. 8 as applied to a webpage, according to an embodiment.

FIG. 9 shows steps 1-5 of the rendering method of FIG. 8 as applied to a webpage by the system of FIG. 3, in accordance with one embodiment of the present invention.

Stage 1 900 shows step 1, in which webpage content is received. Here, webpage content of "This is a very useful patent," in 45-point High Tower Text typeface, is received.

Stage 2 902 shows step 2, in which unmodified strings are received. Here, the first unmodified string is "This is," the second unmodified string is "a very," the third unmodified string is "useful," and the fourth unmodified string is "patent."

Stage 3 904 shows part of step 3, in which the modified characters are received when they are generated. The first step of generating modified characters is defining airspaces for each unmodified character. Here, the upper, inner, and lower airspaces of each unmodified character in "This is a very useful patent" are defined, highlighted with grey a reference box for each airspace.

Stage 4 906 shows part of step 3, in which the modified characters are received when they are generated. The second step of generating modified characters is scaling down an outside airspace of each of the unmodified characters. Here, the upper and lower airspaces of the unmodified characters in "This is," "a very," "useful," and "patent," are compressed according to the first modification in the first set of modification rules. The upper, inner, and lower airspaces of each unmodified and modified character have been enclosed within a grey reference box to better illustrate the modifications to each unmodified character.

Stage 5 908 shows steps 4 and 5, in which the webpage is rendered and displayed on an electronic display. Here, the webpage content to be displayed is drawn, where modified strings are paired together. Each pair of modified strings may be positioned in place of one line of the unmodified strings.

The system embodies a significant advance over existing systems that cannot display strings of characters closer together without creating clutter and harming the legibility of the text.

FIG. 10*a* illustrates an exemplary method for displaying, on an electronic display, a first string of characters and a second string of characters such that there is no interference between the first and second texts, and the layout of displayed content is preserved. In certain embodiments, this method uses characters that have been modified by scaling down an outer airspace of an interfering character or by deemphasizing a portion of the interfering character.

In step 1 1000, the content for an electronic display is received.

According to an embodiment, the computing device receives displayed content over a network.

In step 2 1002, a first string of characters (herein first string) is received.

According to an embodiment, a first string is received when the digital character recognition module scans the content to identify a first string. The entirety of the content may be scanned. Alternatively, a user may select a portion of the content to be scanned.

According to another embodiment, a first string is received when the entirety of the HTML content and associated CSS files are parsed to identify a first string. Alternatively, a user may select a portion of the HTML content and associated CSS files to be parsed. The parsing module parses the tags of the HTML content to identify strings of characters as well as associated Cascading Style Sheet (CSS) files to identify associated character metadata.

According to another embodiment, a user inputs a first string. This may be achieved using an input device 304.

Metadata (identity, position, typeface, font, etc.) of each unmodified character in the unmodified first string may be saved to unmodified character data.

In step 3 1004, a second string of characters (herein second string) is received. The second string may correspond to the first string. Preferably, the second string is a translation of a first string, or otherwise, linguistically linked to the first string.

According to an embodiment, the translation module 317 generates the second string as a translation of the first string. The second string may be generated in the same typeface, font, and point size as the first string. Alternatively, the second string may be generated in a different typeface, font, and/or point size as the first string, to better differentiate the second string from the first string.

According to another embodiment, a user inputs a second string, where the second string corresponds to the first string. For example, the second string may be notes related to the first string. This may be achieved using an input device 304.

According to another embodiment, the second string is received when the digital character recognition module scans the content to identify a second string. The entirety of the content may be scanned. Alternatively, a user may select a portion of the content to be scanned.

According to another embodiment, a second string of characters is received when the entirety of the HTML content and associated CSS files are parsed to identify a second string of characters. Alternatively, a user may select a portion of the HTML content and associated CSS files to be parsed. The parsing module parses the tags of the HTML content to identify strings of characters as well as associated Cascading Style Sheet (CSS) files to identify associated character metadata.

Metadata (identity, position, typeface, font, etc.) of each unmodified character in the second string of characters may be saved to unmodified character data.

In step 4 1006, a final placement of the second string relative to its corresponding first string is determined.

According to an embodiment, the placement module 320 vertically juxtaposes the second string to its corresponding first string. If the second string is placed in between two other strings, the second string may be placed such that base line of the second string is at the midpoint of the base lines of the two other strings.

According to another embodiment, the placement of the first string and the second string is selected based on user preference.

In step 5 1008, it is determined which characters in the first string interfere with characters in the second string. The location and extent of interference between the characters in the first string and characters in the second string is recorded. The interference may be any visual interaction between the first and second strings that harms the readability of characters in the second string. For example, interference may be an overlap of characters in the first string by characters in the second string.

According to an embodiment, the calculation module 318 checks if any character in the second string interferes with any character in the first string. This may be achieved by, for each character in the first string, creating a copy of the character and comparing, pixel by pixel, the upper airspace of the character copy to the upper airspace of the character in the first string. A pixel discrepancy between the upper airspace of the character copy and the upper airspace of the character in the first string indicates interference caused a character in the second string entering the upper airspace of the character in the first string. The vertical distance in between the lowest pixel discrepancy and the top edge of the upper airspace of the character in the first string is saved as the upper airspace reduction value for that character. If there is no pixel discrepancy, the upper airspace reduction value is 0.

Furthermore, for each character in the first string, a copy of the character is created, and the lower airspace of the character copy is compared, pixel by pixel, to the lower airspace of the character in the first string. A pixel discrepancy between the lower airspace of the character copy and the lower airspace of the character in the first string indicates interference caused by a character in the second string entering the lower airspace of a character in the first string. The vertical distance in between the highest pixel discrepancy and the bottom edge of the lower airspace of the character in the first string is saved as the lower airspace reduction value for that character. If there is no pixel discrepancy, the lower airspace reduction value is 0.

According to another embodiment, the calculation module 318 checks if any character in the second string interferes with any character in the first string. This may be achieved by, for each character in the first string, creating a copy of the character and comparing, pixel by pixel, the airspace of the character copy to the airspace of the character in the first string. A pixel discrepancy between the airspace of the character copy and the airspace of the character in the first string indicates interference caused by a character in the second string entering the airspace of a character in the first string. The collection of pixel discrepancies corresponding to a character is herein referred to as the interference area for that character.

Characters in the first string that were determined to interfere with characters in the second string are herein referred to as interfering characters.

In step 6 1010, the modified characters are received.

The footprint of the modified characters should not exceed the footprint of their corresponding interfering characters. Furthermore, the modified characters, when displayed in place of their corresponding interfering characters, should not interfere with characters in the second text. Preferably, the attributes (typeface, font, font size, etc.) of the modified characters match the attributes of the interfering characters as closely as possible.

According to another embodiment, the modified characters are received when modified characters are generated using airspace scaling, each modified character corresponding to an interfering character. New modified characters may be generated when there are no modified characters with the desired attributes in the memory. Generating the modified characters using airspace scaling includes the steps of 1) defining character airspaces for the interfering characters and 2) scaling down the footprint of the interfering character. Specific scaling modifications may be chosen based on user preference.

Preferably, character airspaces for interfering characters are defined when the calculation module retrieves, from unmodified character data, the positions of the text ceiling, the text floor, the text base line, and the text x-height line for the interfering character. The calculation module defines the upper airspace of the interfering character as the area bounded by the text x-height line, the text ceiling, the leftmost point of the interfering character, and the rightmost point of the interfering character. The calculation module defines the inner airspace of the interfering character as the area bounded by the text base line, the text x-height line, the leftmost point of the interfering character, and the rightmost point of the interfering character. The calculation module defines the lower airspace of the interfering character as the area bounded by the text floor, the text base line, the leftmost point of the interfering character, and the rightmost point of the interfering character.

Alternatively, character airspaces for interfering characters are defined when, based on the interfering character's metadata, the calculation module generates, with the same attributes as the interfering character, an "x" as well as an exemplary string of characters with ascenders and descenders such as "pd." The text ceiling is set to the position of the topmost point of the exemplary string, the text floor is set to the position of the bottommost point of the exemplary string, the text base-line is set to the position of the bottommost point of the "x," and the text x-height line is set to the position of the topmost point of the "x." The calculation module defines the upper airspace of the interfering character as the area bounded by the text x-height line, the text ceiling, the leftmost point of the interfering character, and the rightmost point of the interfering character. The calculation module defines the inner airspace of the interfering character as the area bounded by the text base line, the text x-height line, the leftmost point of the interfering character, and the rightmost point of the interfering character. The calculation module defines the lower airspace of the interfering character as the area bounded by the text floor, the text base line, the leftmost point of the interfering character, and the rightmost point of the interfering character.

Preferably, footprints of the interfering characters are scaled down when the operations module scales down the upper airspace of each interfering character by at least the upper airspace reduction value for that character and scales down the lower airspace of each interfering character by at least the lower airspace reduction value for that character. The modified characters may be saved to the modified character data. In some embodiments, the upper and lower airspaces may be scaled down according to the first set of modification rules, the first set of modification rules including at least one of the first, second, third, and fourth modifications. The modified characters may be saved to the modified character data.

Alternatively, footprints of the interfering characters are scaled down when the operations module scales down the footprint of each interfering character, where the top edge of the footprint of the modified character is below the top edge of the footprint of the corresponding interfering character by at least the upper airspace reduction value for that character and the bottom edge of the footprint of the modified character is above the bottom edge of the footprint of the corresponding interfering character by at least the lower airspace reduction value for that character. The modified characters may be saved to the modified character data.

According to another embodiment, the modified characters are received when modified characters are generated using deemphasis, where each modified character corresponds to an interfering character. New modified characters may be generated when there are no modified characters with the desired attributes in the memory. Generating the modified characters using deemphasis includes the steps of 1) deemphasizing a portion of the interfering character adjacent an interference area. Specific deemphasis modifications may be chosen based on user preference.

Preferably, the operations module deemphasizes a portion of the interfering character adjacent an interference area. The portion of the interfering character adjacent an interference area can be chosen based on an area within a certain distance of the interference area. Alternatively, the portion of the interfering character adjacent an interference area can be an entire upper airspace or an entire lower airspace where the interference are is located. The modified characters may be saved to the modified character data. In some embodiments, a portion of the interfering character is deemphasized according to the second set of modification rules, the second set of modification rules including at least one of the fifth, sixth, and seventh modifications. The modified characters may be saved to the modified character data.

According to another embodiment, the modified characters are received when the calculation module retrieves, from modified character data, a modified character corresponding to each of the interfering characters.

Preferably, the received modified character is created using the modified character generation methods described above, specifically airspace scaling and deemphasis. For example, a received modified character is identical to its corresponding interfering character except for that the modified character has an upper airspace that has been scaled down through compression.

Alternatively, the top edge of the footprint of the received modified character is below the top edge of the footprint of the corresponding interfering character and the bottom edge of the footprint of the received modified character is above the bottom edge of the footprint of the corresponding interfering character. For example, a received modified character is identical to its corresponding interfering character except for that the modified character has a footprint that has been compressed such as in FIG. 5a.

In step 7 1012, the display content is rendered for display.

According to one embodiment, the renderer, in conjunction with the placement module, draws the content to be displayed on the display screen. The modified characters are used in place of their corresponding interfering characters based on positional metadata of the interfering characters. Modified characters may be superimposed over their corresponding interfering characters. Any interference between characters in the first string and characters in the second string is reduced.

In step 8, the content is displayed on an electronic display.

Figure 10:
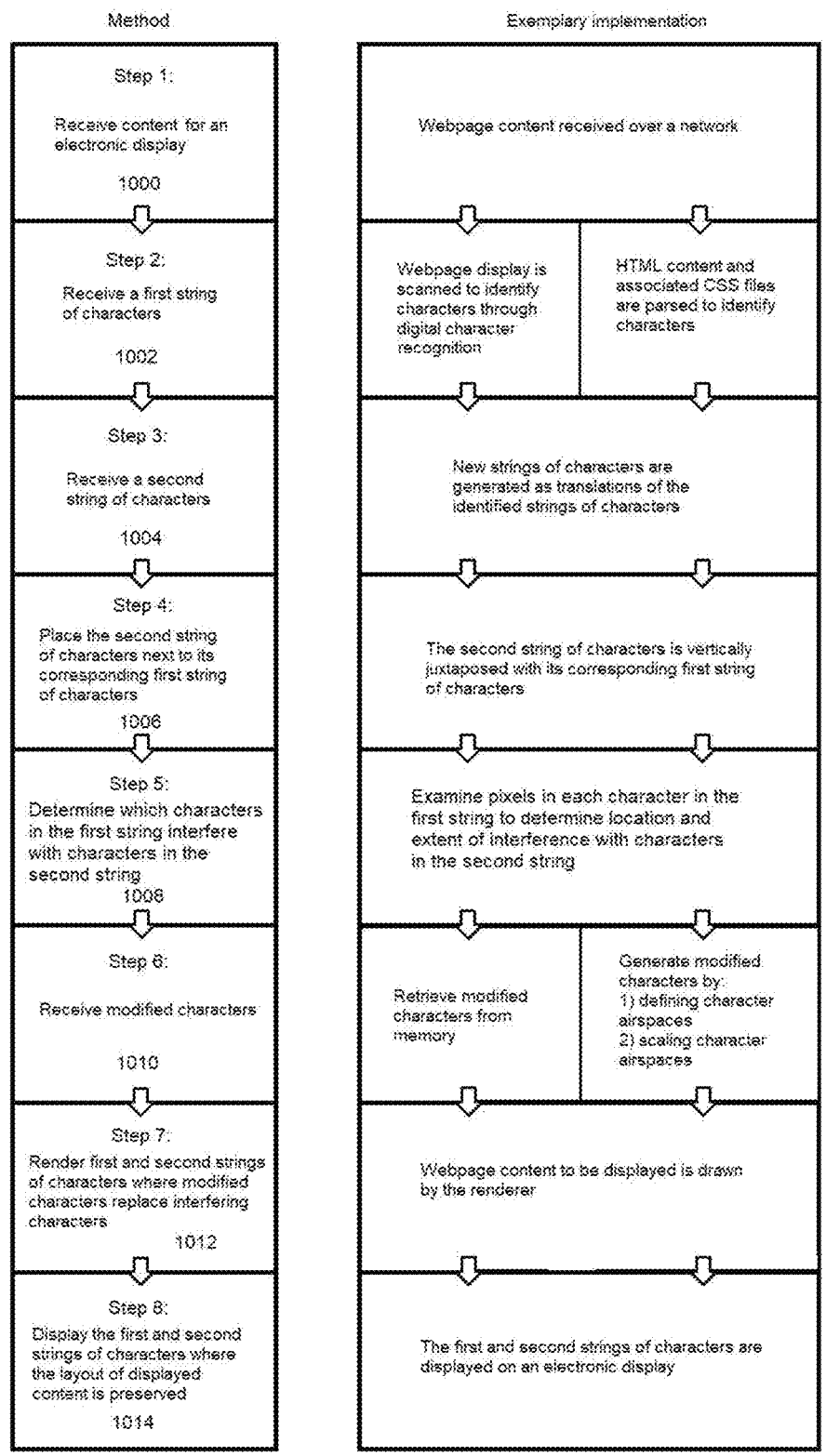
FIG. 10 shows a method for displaying, on an electronic display, a first string of characters and a second string of characters such that there is no interference between the first and second strings, and the layout of displayed content is preserved. Exemplary ways to implement a step in the method are included to the right of the corresponding step.
Figure 11:
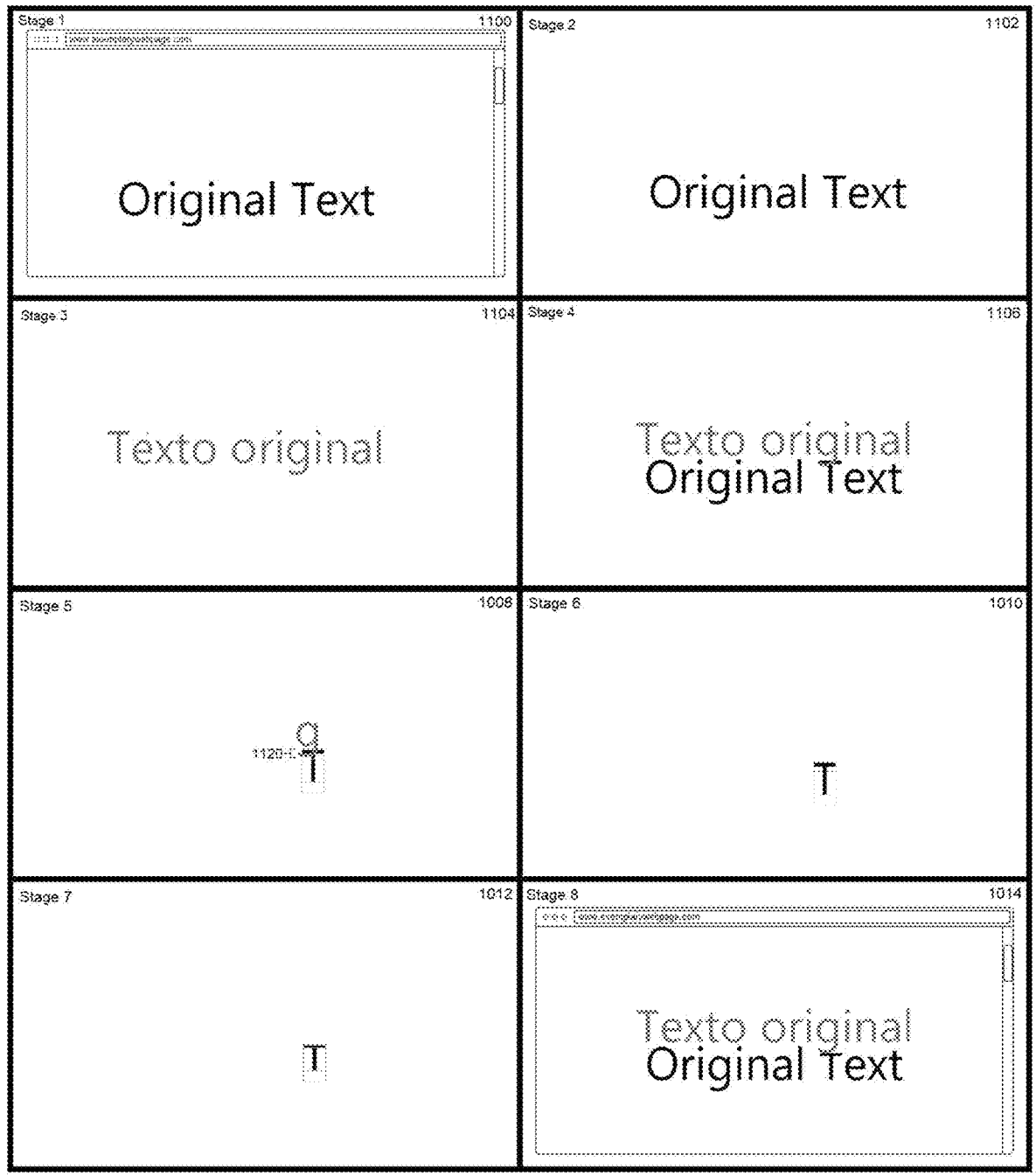
FIG. 11 shows the method of FIG. 10 as applied to a webpage, according to an embodiment.

FIG. 11 shows steps 1-8 of the rendering method of FIG. 10 as applied to a webpage by the system of FIG. 3, in accordance with one embodiment of the present invention.

Stage 1 1100 shows step 1, in which webpage content is received. Here, webpage content of "Original Text Original Text," in 48-point Segoe UI typeface, is received.

Stage 2 1102 shows step 2, in which the first string of characters is received. Here, the first string is "Original Text."

Stage 3 1104 shows step 3, in which a second string of characters is received. Here, a second string, "Texto original," in 48-point Segoe UI typeface, is received. The second string is a generated translation of the first string.

Stage 4 1106 shows step 4, in which the second string is positioned next to its corresponding first string. Here, the second string is positioned above the first string.

Stage 5 1108 shows step 5, in which it is determined which characters in the first string interfere with characters in the second string, as well as the location and extent of the overlap. Here, the "T" overlaps the "g." The "T" is marked as an interfering character. The upper airspace reduction value 1120 for the interfering character is saved.

Stage 6 1110 shows part of step 6, in which the modified character is received when it is generated using airspace scaling. The first step of generating a modified character using airspace scaling is defining airspaces for the interfering character. Here, the upper, inner, and lower airspaces of the "T" are defined, highlighted with grey a reference box for each airspace.

Stage 7 1112 shows part of step 6, in which the modified character is received when it is generated using airspace scaling. The second step of generating a modified character using airspace scaling is scaling down an upper airspace of the interfering character by at least the upper airspace reduction value for that character as well as scaling down a lower airspace of the interfering character by at least the lower airspace reduction value for that character. Here, the upper airspace of the "T" is scaled down according to the third modification in the first set of modification rules. The upper, inner, and lower airspaces of the modified character are highlighted with a grey reference box to better show the modifications.

Step 8 1114 shows steps 7 and 8, in which the webpage is rendered and displayed on an electronic display. Here, the webpage content to be displayed is drawn, where the interfering character is replaced with a modified character. The interference between any character in the first string and any character in the second string is reduced.

The system embodies a significant advance over existing systems that cannot display two strings where there is no interference between the two strings as well as no change to the layout of the displayed content.

Figure 12A:
FIG. 12a shows a webpage display containing unmodified strings.
Figure 12B:
FIG. 12b shows the webpage display of FIG. 12a where the upper airspaces of the interfering characters are scaled down such that the interfering characters are flush with characters in the second string.
Figure 12C:
FIG. 12c shows the webpage display of FIG. 12a where the upper airspaces of the interfering characters are scaled down in such that there is a gap between the interfering characters and characters in the second string.
Figure 12D:
FIG. 12d shows the webpage display of FIG. 12a where the upper airspaces of the interfering characters are shaded.
Figure 12E:
FIG. 12e shows the webpage display of FIG. 12a where the upper airspaces of the interfering characters are gradually shaded.
Figure 12F:
FIG. 12f shows the webpage display of FIG. 12a where the upper airspace of the interfering characters are hollowed-out.

FIG. 12a shows a first string of characters, "lizard" in English, and a second string of characters, "lagartija" in Spanish, as displayed on a webpage. The "g" overlaps the "i" and the "j" overlaps the "d". FIGS. 12b-12e show the webpage of FIG. 12a where the first and second strings are displayed using various scaling and deemphasis modifications, according to the method of FIG. 10. In FIG. 12b, the upper airspace of the interfering characters is scaled down such that the interfering characters are flush with characters in the second string. In FIG. 12c, the upper airspace of the interfering characters is scaled down in such that there is a gap between the interfering characters and the characters in second string. In FIG. 12d, the upper airspace of the interfering characters is shaded. In FIG. 12e, the upper airspace of the interfering characters is gradually shaded. In FIG. 12f, the upper airspace of the interfering characters is hollowed-out. Compared to the interference between the first and second strings in FIG. 12a, there is reduced interference between the first and second strings in FIGS. 12b-12e.

Figure 13:
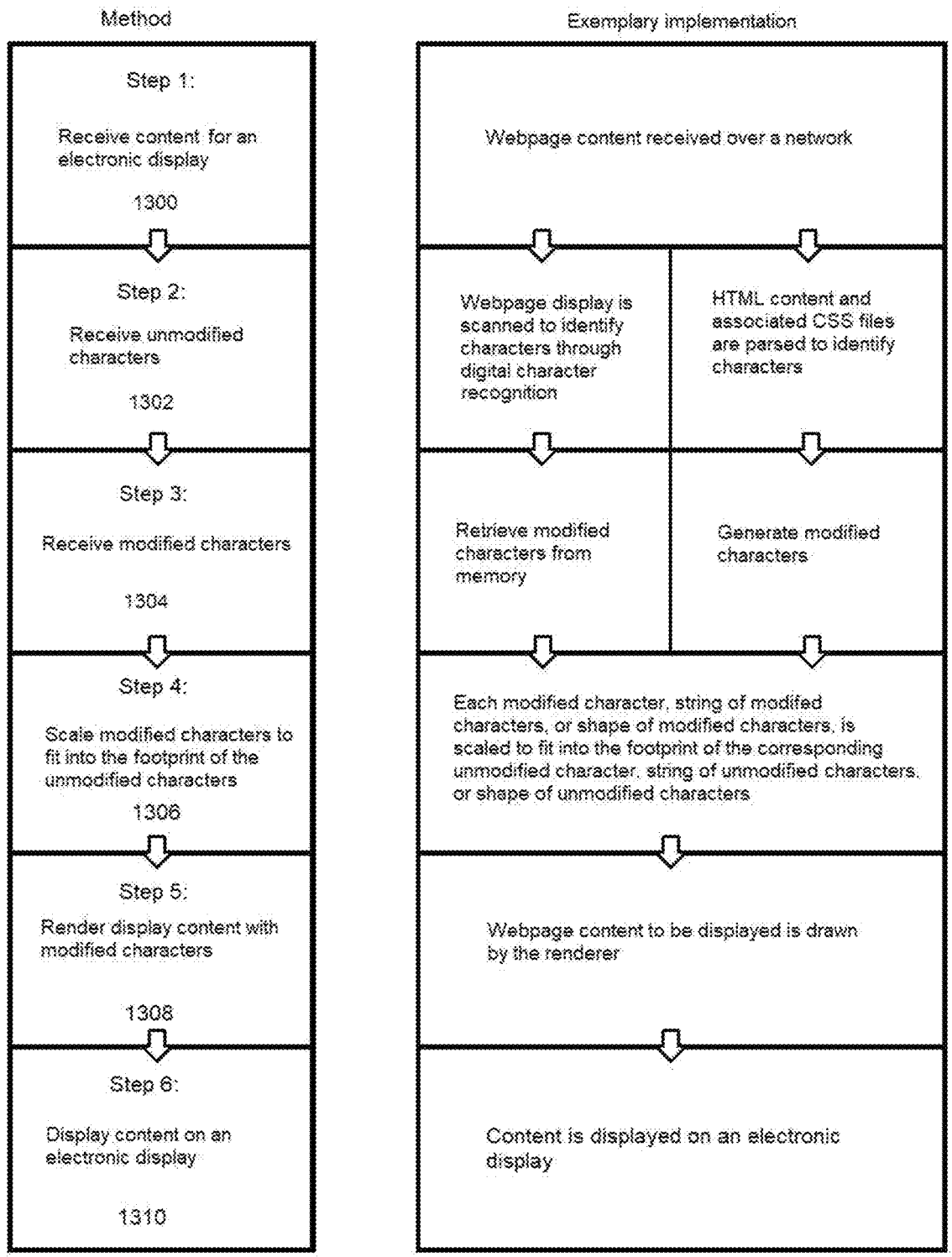
FIG. 13 shows a method for displaying text with personalized text attributes on an electronic display in a manner that preserves the layout of displayed content. Exemplary ways to implement a step in the method are included to the right of the corresponding step.

FIG. 13 illustrates an exemplary method for displaying text with personalized text attributes on an electronic display in a manner that preserves the layout of displayed content. This method uses characters that have been modified by personalizing attributes of the text and scaling the modified characters.

In step 1 1300, the content for an electronic display is received.

According to an embodiment, the computing device receives content over a network.

In step 2 1302, at least one unmodified character is received. The footprints of each unmodified character may be combined into an unmodified text footprint.

According to an embodiment, unmodified characters are received when the digital character recognition module scans the content to identify characters. The entirety of the content may be scanned. Alternatively, a user may select a portion of the content to be scanned. Metadata (identity, position, typeface, font, etc.) of each unmodified character may be saved to unmodified character data.

According to another embodiment, unmodified characters are received when the parsing module parses HTML content and associated CSS files. The entirety of the HTML content and associated CSS files may be parsed. Alternatively, a user may select a portion of the HTML content and associated CSS files to be parsed. The parsing module parses the tags of the HTML content to identify characters as well as associated Cascading Style Sheet (CSS) files to identify associated character metadata. Metadata (identity, position, typeface, font, size, etc.) of each unmodified character may be saved to unmodified character data.

In step 3 1304, modified characters are received.

According to an embodiment, the modified characters are received when the calculation module retrieves, from modified character data, a modified character corresponding to each of the unmodified characters. Preferably, a user can select the desired attributes of each received modified character, such as the font, font size, capitalization, italics, etc. For example, an unmodified character is a "d." The received modified version is a "D."

According to another embodiment, the modified characters are received when a modified character is generated for each of the unmodified characters. New modified characters may be generated when there are no modified characters with the desired attributes in the memory. The modified characters can be generated to have any desired attributes such as the font, font size, capitalization, italics, etc., based on user preference.

In step 4 1306, modified characters are scaled to fit into the unmodified text footprint.

According to an embodiment, the modified characters are placed in the same arrangement as their corresponding unmodified characters. The footprints of each modified character may be combined into a modified text footprint. The modified characters are scaled, in the horizontal and/or vertical directions, until the modified text footprint is equal to the unmodified text footprint.

In step 5 1308, the content is rendered for display.

According to one embodiment, the renderer, in conjunction with the placement module, draws the content to be displayed on the display screen. The modified characters are used in place of their corresponding unmodified characters such that the modified text footprint covers the unmodified text footprint. Modified characters may be superimposed over their corresponding unmodified characters.

In step 6 1310, the content is displayed on an electronic display.

Figure 14:
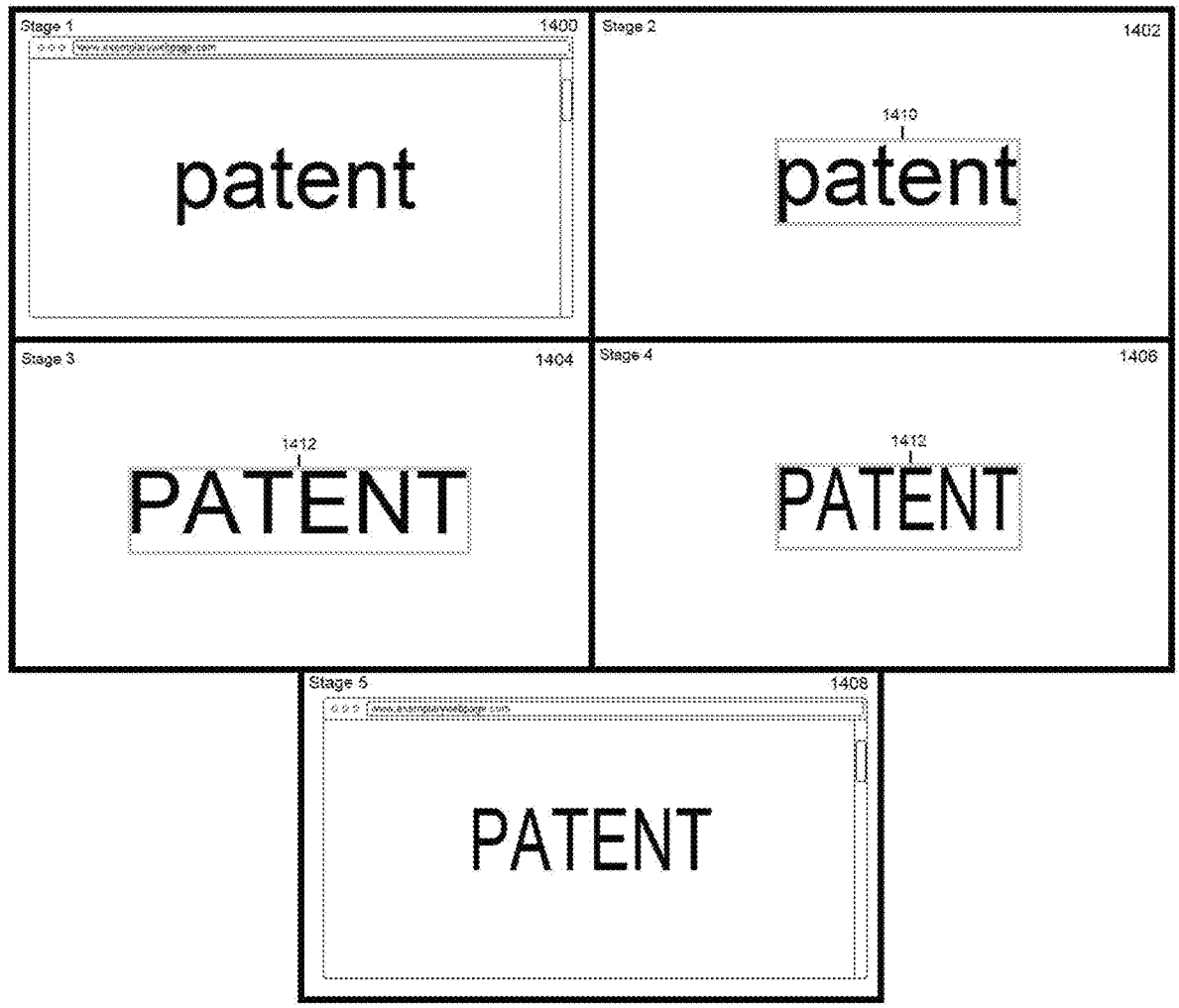
FIG. 14 shows the method of FIG. 13 as applied to a webpage, according to an embodiment.

FIG. 14 shows steps 1-6 of the method of FIG. 13 as applied to a webpage by the system of FIG. 3, in accordance with one embodiment of the present invention.

Stage 1 1400 shows step 1, in which display content is received. Here, webpage content of "patent," in 150-point Arial, is received.

Stage 2 1402 shows step 2, in which the unmodified characters are received. Here, the unmodified characters are identified as "p," "a," "t," "e," "n," and "t," all in 150-point Arial. The unmodified text footprint 1410 is highlighted with a first grey reference box.

Stage 3 1404 shows step 3, in which the modified characters are received when they are generated. Here, the generated modified characters are "P," "A," "T," "E," "N," and "T," all in 150-point Arial font and capitalized. The modified text footprint 1412 is highlighted with a second grey reference box.

Stage 4 1406 shows step 4, in which the modified characters are scaled to fit into the unmodified text footprint. Here, the modified characters are placed in the same arrangement as their corresponding unmodified characters. The modified text characters are scaled, in the horizontal direction, until the modified text footprint 1412 is equal to the unmodified text footprint 1410.

Stage 5 1408 shows steps 5 and 6, in which the webpage is rendered and displayed on an electronic display. Here, the webpage content to be displayed is drawn, where modified characters are used in place of their corresponding characters.

The system embodies a significant advance over existing systems that cannot display characters with personalized attributes in a manner that preserves the layout of displayed content.

Methods in this document are illustrated as blocks in a logical flow graph, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described method blocks can be combined in any order to implement the illustrated method, or alternate methods. Additionally, individual blocks may be deleted from the methods without departing from the spirit and scope of the subject matter described herein.

We claim:

1. A method of displaying two text-string characters in an interference-reducing manner, the method implemented by a computing device, the method comprising:
   receiving, by the computing device, a first text-string character originating from a first input device;
   receiving, by the computing device, a second text-string character originating from one of the first input device and a second input device;
   identifying, based on a pixel by pixel comparison of the first text-string character to the second text-string character, shared pixels that form a part of both text-string characters;
   causing, by the computing device, a non-entire portion of the pixels that form the second text-string character to appear deemphasized, wherein:
      the non-entire portion of the pixels that form the second text-string character does not include the shared pixels;
      the non-entire portion of the pixels that form the second text-string character is adjacent to the shared pixels;
      deemphasis is one of shading, gradual shading, and hollowing-out; and
   displaying, on an electronic display, the first text-string character and the second text-string character, wherein the pixels that form the non-entire portion of the second character appear deemphasized.

\* \* \* \* \*